(12) United States Patent
Alvarez Rodriguez

(10) Patent No.: US 8,930,502 B2
(45) Date of Patent: Jan. 6, 2015

(54) INTERNET VEHICLE DATA LOGGER FRAMEWORK THAT PROVIDE DATA CONTROLLER BY THE USER IN STANDARDIZED HUMAN UNDERSTANDABLE FORMAT VIA WEB SERVICES

(71) Applicant: Cesar Enrique Alvarez Rodriguez, Houston, TX (US)

(72) Inventor: Cesar Enrique Alvarez Rodriguez, Houston, TX (US)

( * ) Notice: Subject to any disclaimer, the term of this patent is extended or adjusted under 35 U.S.C. 154(b) by 221 days.

(21) Appl. No.: 13/708,923

(22) Filed: Dec. 7, 2012

(65) Prior Publication Data

US 2013/0151671 A1 Jun. 13, 2013

Related U.S. Application Data

(60) Provisional application No. 61/568,116, filed on Dec. 7, 2011.

(51) Int. Cl.
*G06F 15/16* (2006.01)
*H04L 29/08* (2006.01)

(52) U.S. Cl.
CPC .............. *H04L 67/00* (2013.01); *H04L 67/125* (2013.01)
USPC ............. 709/219; 705/22; 705/26.5; 370/255

(58) Field of Classification Search
USPC ...................... 709/219; 705/22, 26.5; 370/255
See application file for complete search history.

(56) References Cited

U.S. PATENT DOCUMENTS

| | | | | |
|---|---|---|---|---|
| 8,732,023 | B2* | 5/2014 | Mikurak | 705/22 |
| 2002/0091991 | A1* | 7/2002 | Castro | 717/106 |
| 2004/0064351 | A1* | 4/2004 | Mikurak | 705/7 |
| 2006/0098588 | A1* | 5/2006 | Zhang et al. | 370/255 |
| 2006/0178918 | A1* | 8/2006 | Mikurak | 705/7 |
| 2010/0097208 | A1* | 4/2010 | Rosing et al. | 340/539.13 |
| 2011/0251868 | A1* | 10/2011 | Mikurak | 705/7.25 |
| 2012/0089410 | A1* | 4/2012 | Mikurak | 705/1.1 |
| 2012/0259722 | A1* | 10/2012 | Mikurak | 705/26.1 |
| 2013/0151671 | A1* | 6/2013 | Alvarez Rodriguez | 709/219 |
| 2014/0222610 | A1* | 8/2014 | Mikurak | 705/26.5 |

* cited by examiner

*Primary Examiner* — Tammy Nguyen

(57) ABSTRACT

Software applications that retrieve, log, and communicate vehicle-related data are implemented within a system that includes a plurality of vehicles, a worldwide network, at least one web server, at least one database server, and a plurality of internet-enabled back-end devices. Each vehicle has at least one internet-enabled front-end device, which is communicably coupled to the vehicle's computer system access device. The internet-enabled front-end device of each vehicle retrieves the vehicle-related data through a software application, which is also used to send the vehicle-related data to the web server. The web server collects data from each vehicle and properly organizes and stores the data on the database server. The web server and the database service implements a system software to manage and process the data from each vehicle. Once the system software processes the data, the internet-enabled back-end devices can access the data through external applications or information systems.

12 Claims, 23 Drawing Sheets

ACCESS CONTROL

| Company/Developer | Application | DATA | MY VEHICLES | | | |
|---|---|---|---|---|---|---|
| | | | Toyota Echo 2002 | Honda Civic L 99 | Volkswagen Jetta 2011 | Other Other |
| The Battery App Company | My Battery Level | Your User ID | ☑ | ☐ | ☐ | ☐ |
| | | Your Vehicle VIN | ☑ | ☐ | ☐ | ☐ |
| | | *Battery Voltage | ☑ | ☑ | ☐ | ☐ |
| GPH Co. | My Gas per Hour | Your User ID | ☑ | ☑ | ☐ | ☐ |
| | | Your Vehicle VIN | ☐ | ☑ | ☐ | ☐ |
| | | *GPH | ☑ | ☑ | ☐ | ☐ |
| Co2.gov | CO2 Emissions | *Co2 | ☑ | ☐ | ☐ | ☑ |

*REQUIRED

FIG. 9

Application Name: Your Milage

| DATA | | REQUIRED? |
|---|---|---|
| VIN | ▲▼ | ☑ |
| User ID | ▲▼ | ☑ |
| Distance | ▲▼ | ☑ |
| Fuel Efficency | ▲▼ | ☐ |
| | ▲▼ | |
| | ▲▼ | |
| | ▲▼ | |
| | ▲▼ | |

SAVE

FIG. 10

INTERNET VEHICLE DATA LOGGER FRAMEWORK THAT PROVIDE DATA CONTROLLER BY THE USER IN STANDARDIZED HUMAN UNDERSTANDABLE FORMAT VIA WEB SERVICES

The current application claims a priority to the U.S. Provisional Patent application Ser. No. 61/568,116 filed on Dec. 7, 2011.

FIELD OF THE INVENTION

The present invention relates generally to a system and a method of remotely collecting vehicle-related data from a plurality of vehicles and accumulating the vehicle-related data within a localized database, which allows a plurality of external applications or information systems to retrieve the vehicle-related data from the localized database.

BRIEF DESCRIPTION OF THE DRAWINGS

FIG. 9 is a mock-up webpage depicting the user access control setup.

FIG. 10 is a mock-up webpage depicting the data retrieval application or information system setup

SUMMARY OF THE INVENTION

Figure 1:
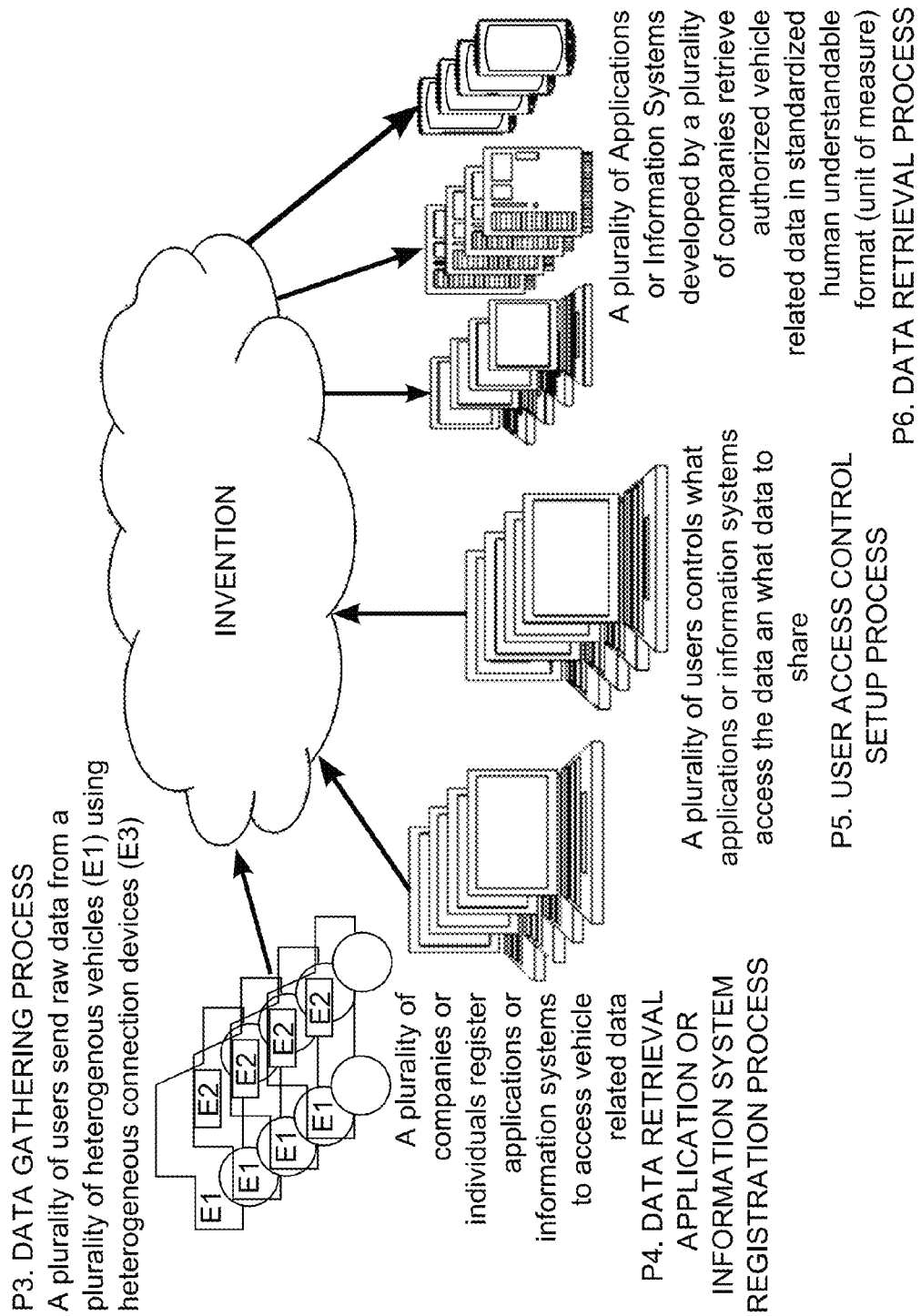
FIG. 1 is an overview of the present invention.
Figure 2A:
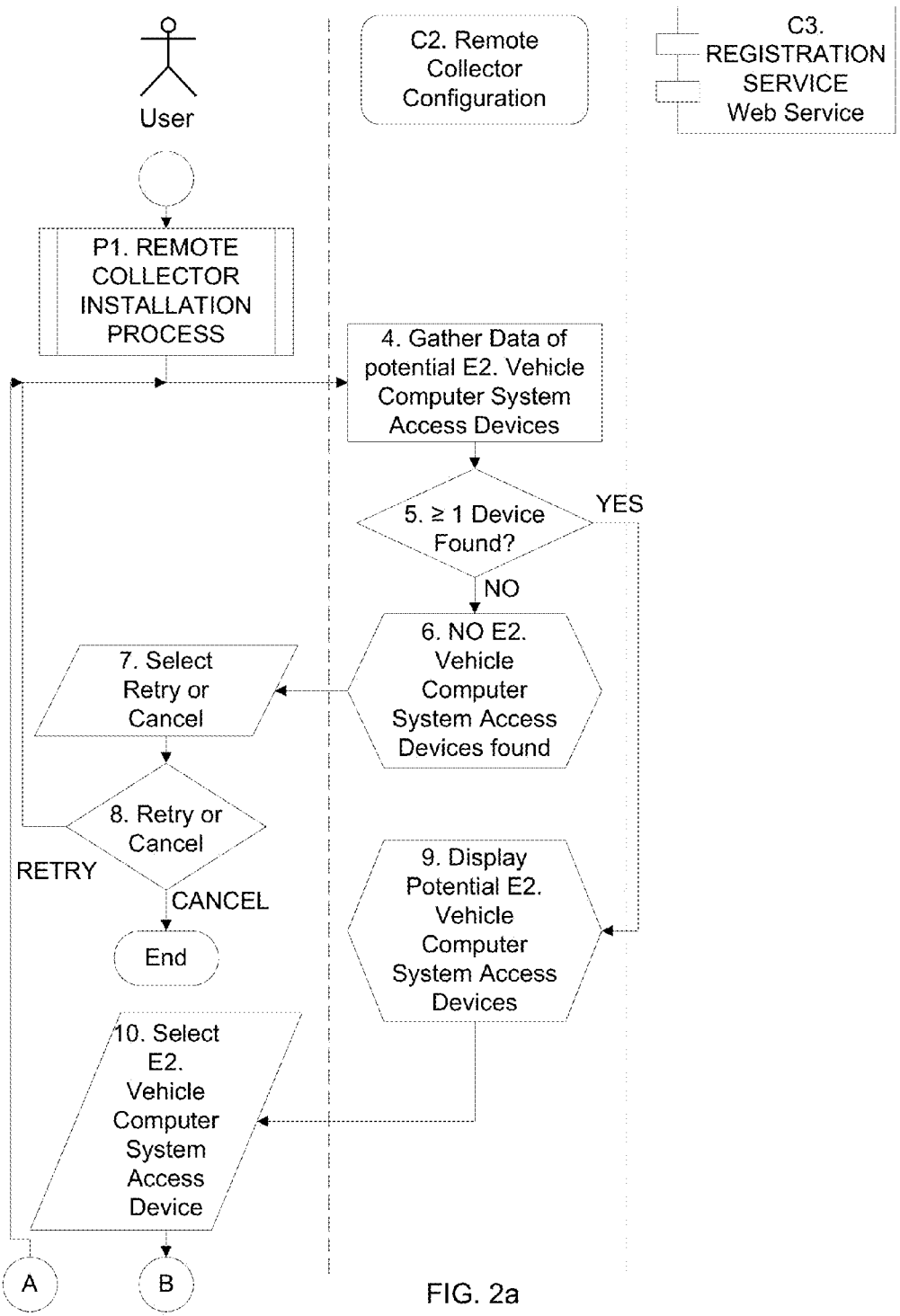
FIG. 2A is a flowchart outlining the remote collector configuration process for the present invention.
Figure 2B:
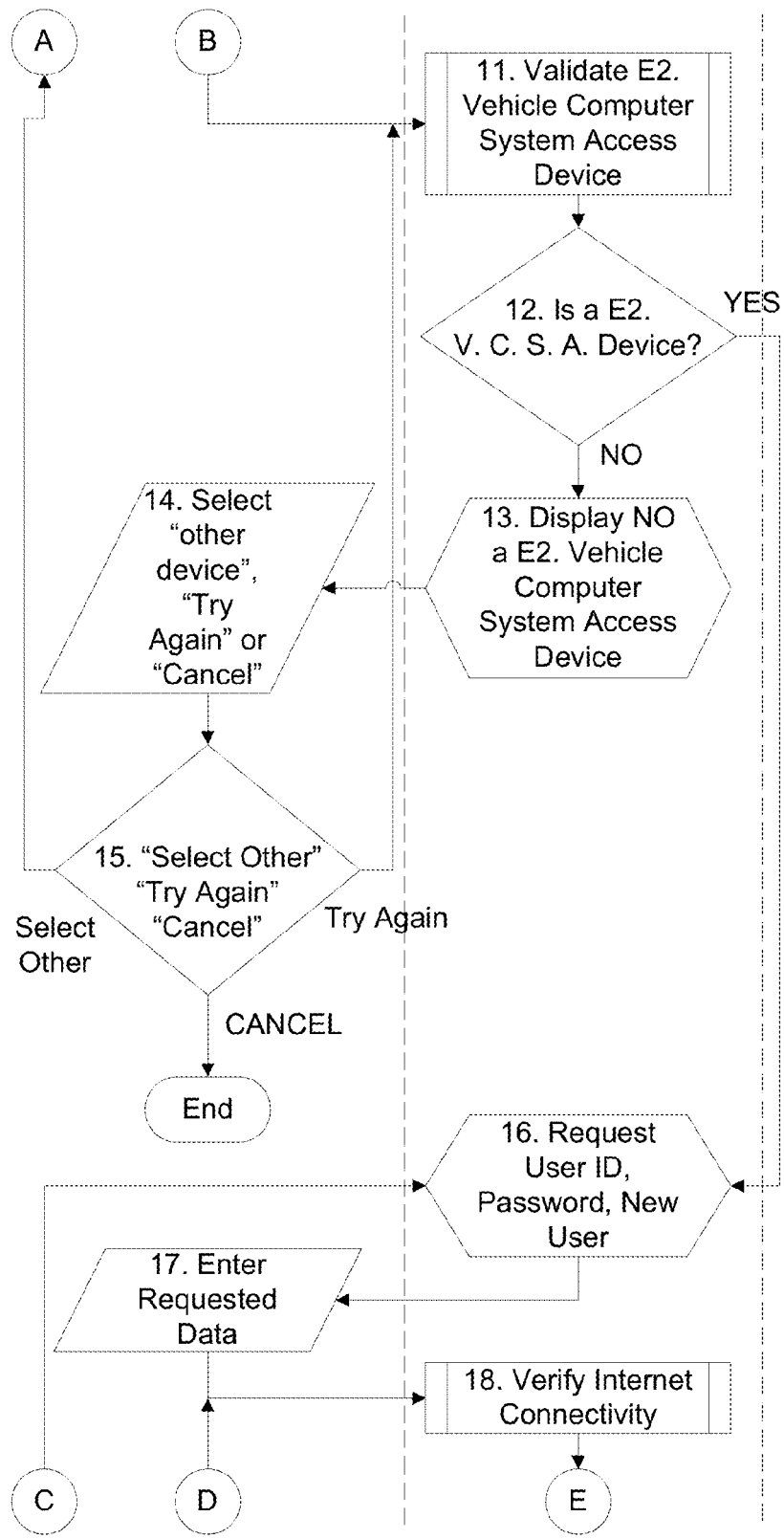
FIG. 2B is a continuation of the flowchart shown in FIG. 2A.
Figure 2C:
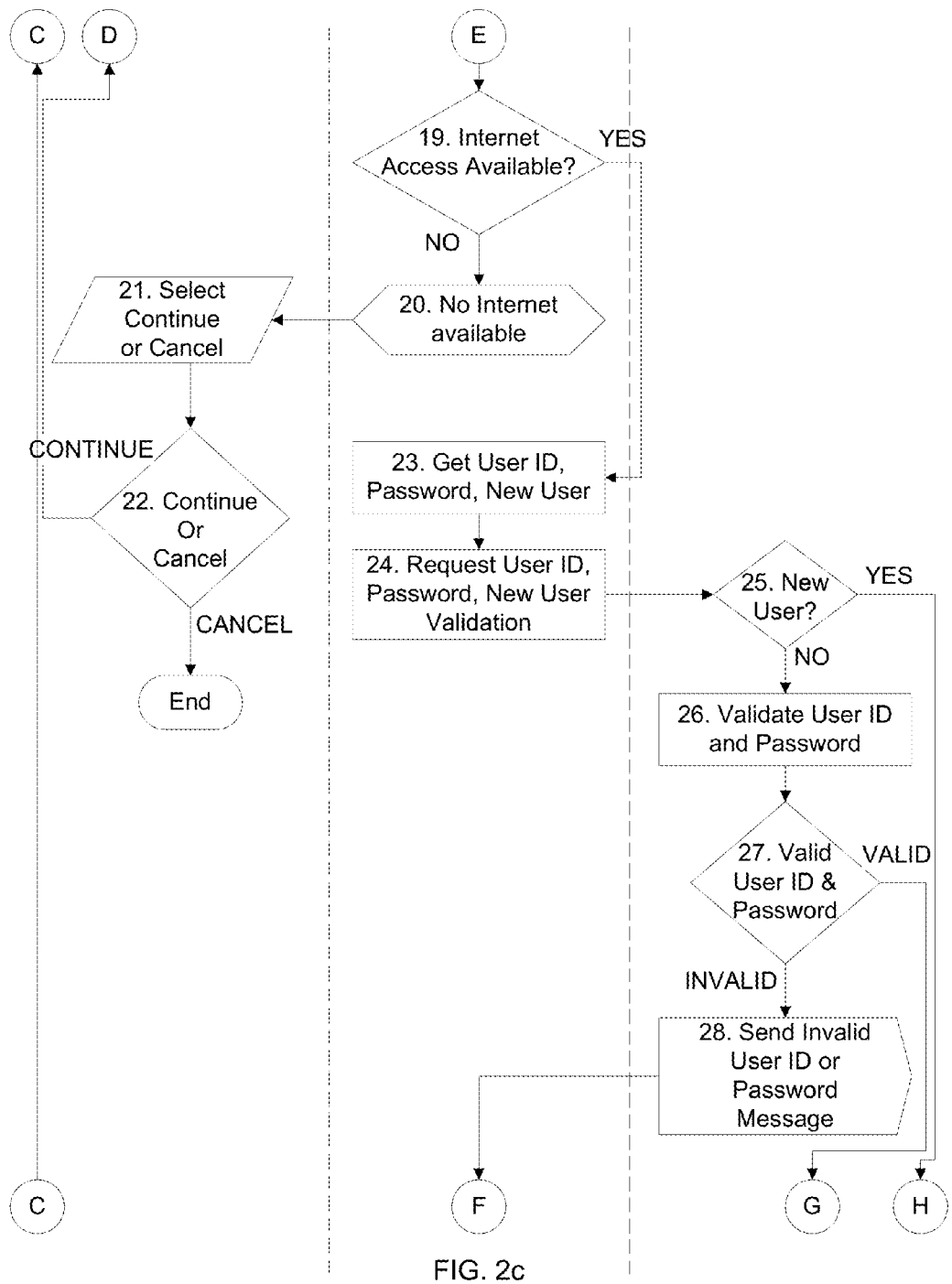
FIG. 2C is a continuation of the flowchart shown in FIG. 2B.
Figure 2D:
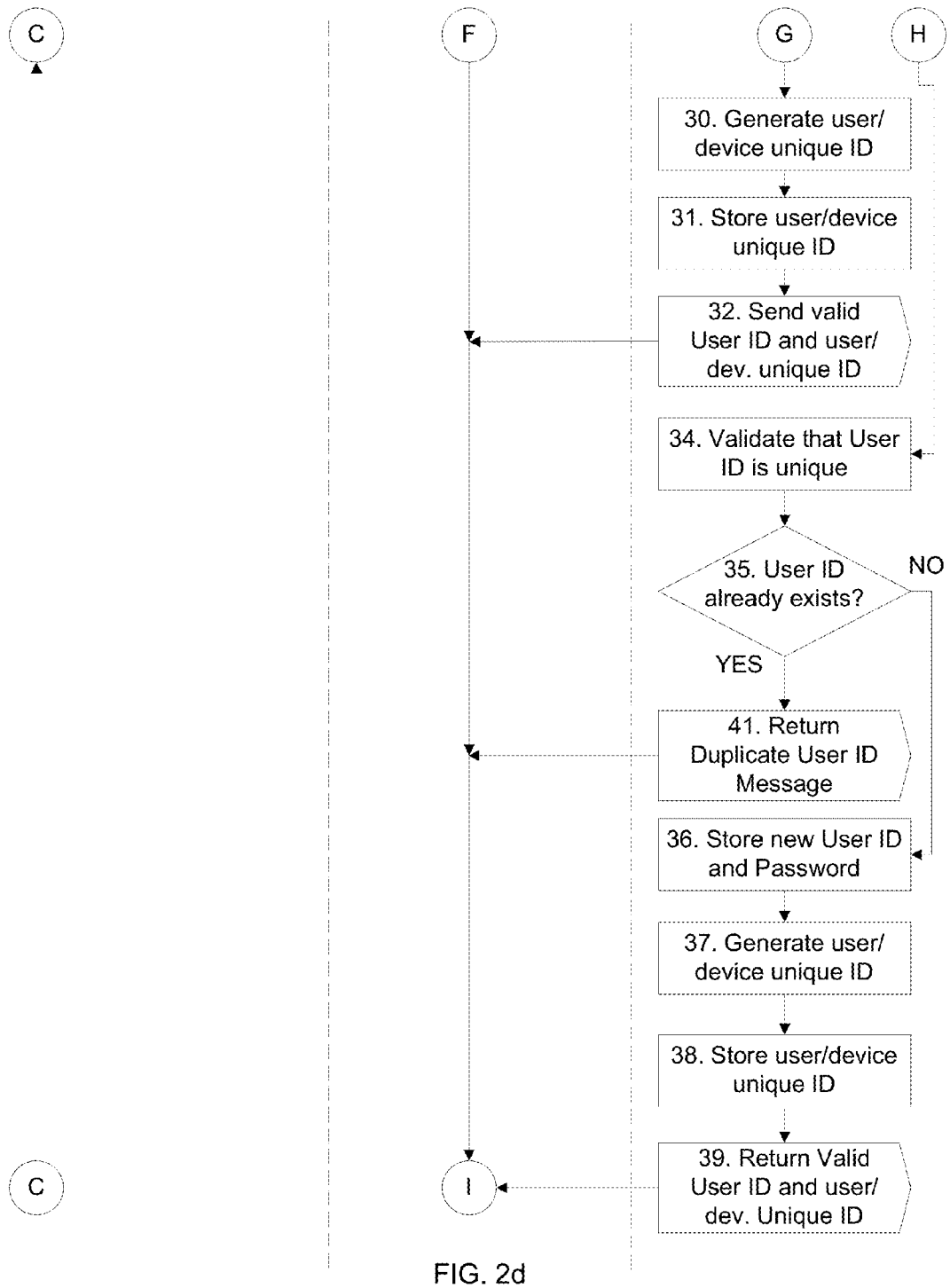
FIG. 2D is a continuation of the flowchart shown in FIG. 2C.
Figure 2E:
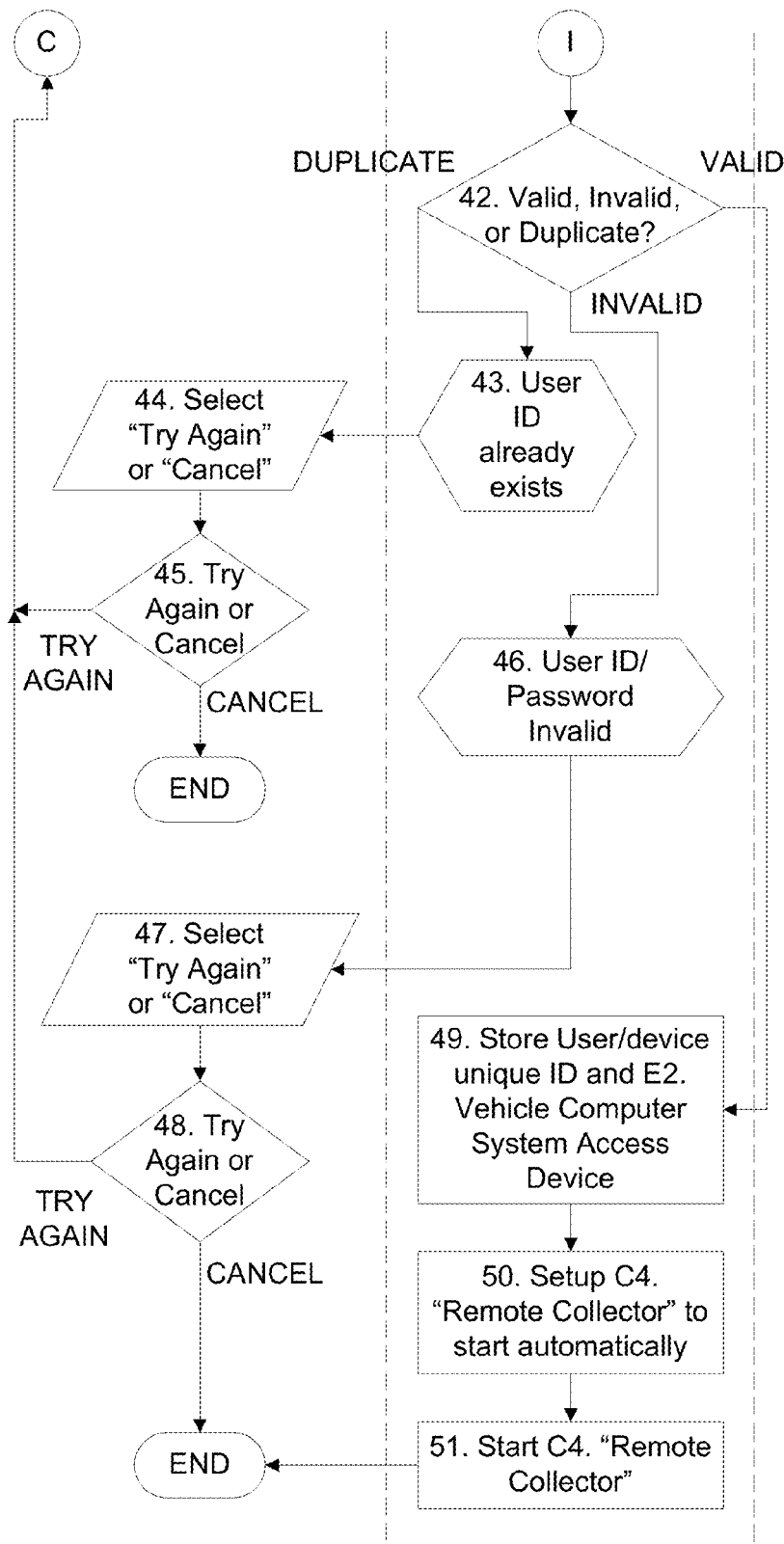
FIG. 2E is a continuation of the flowchart shown in FIG. 2D.
Figure 3A:
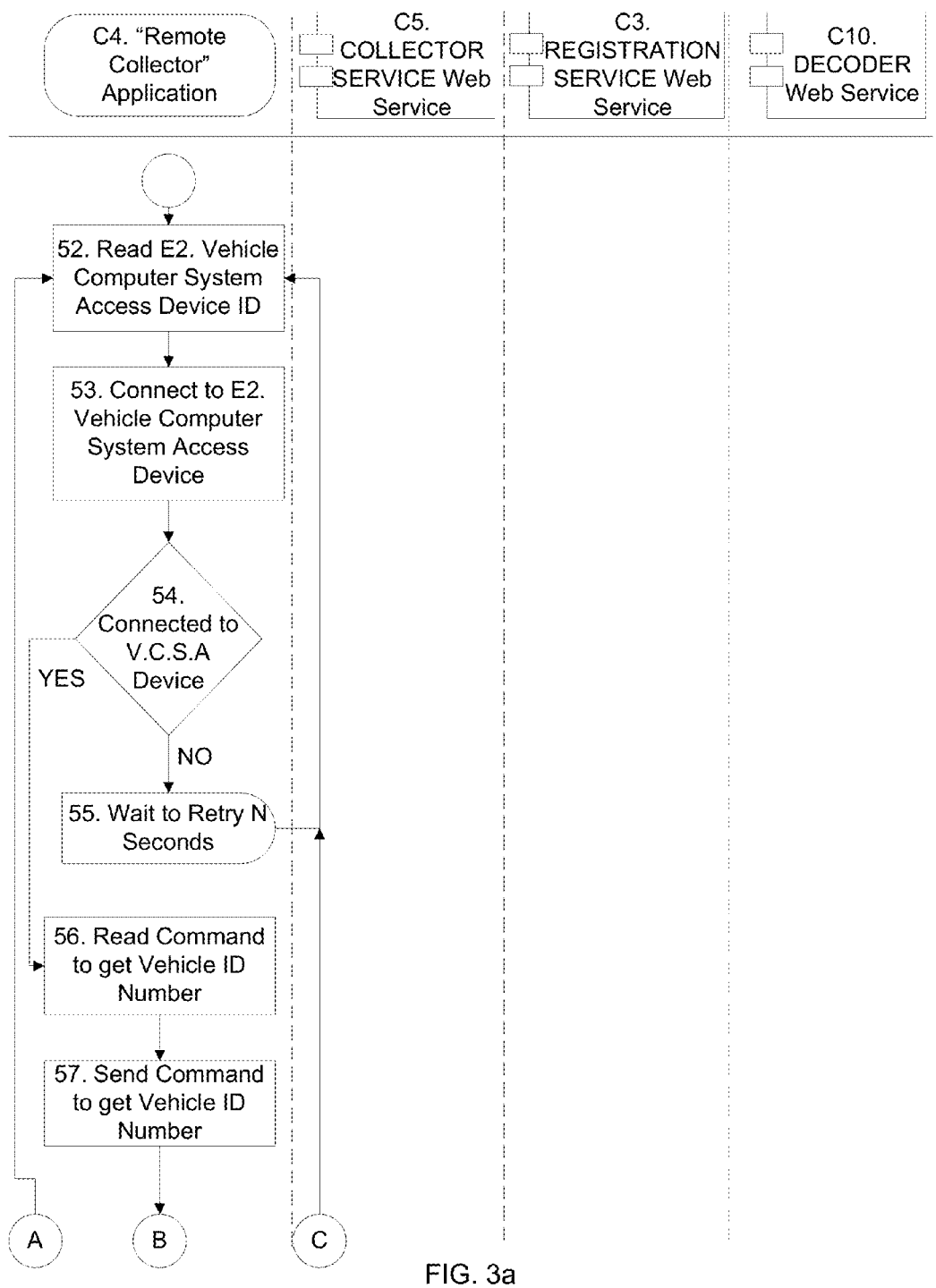
FIG. 3A is a flowchart outlining the data gathering process for the present invention.
Figure 3B:
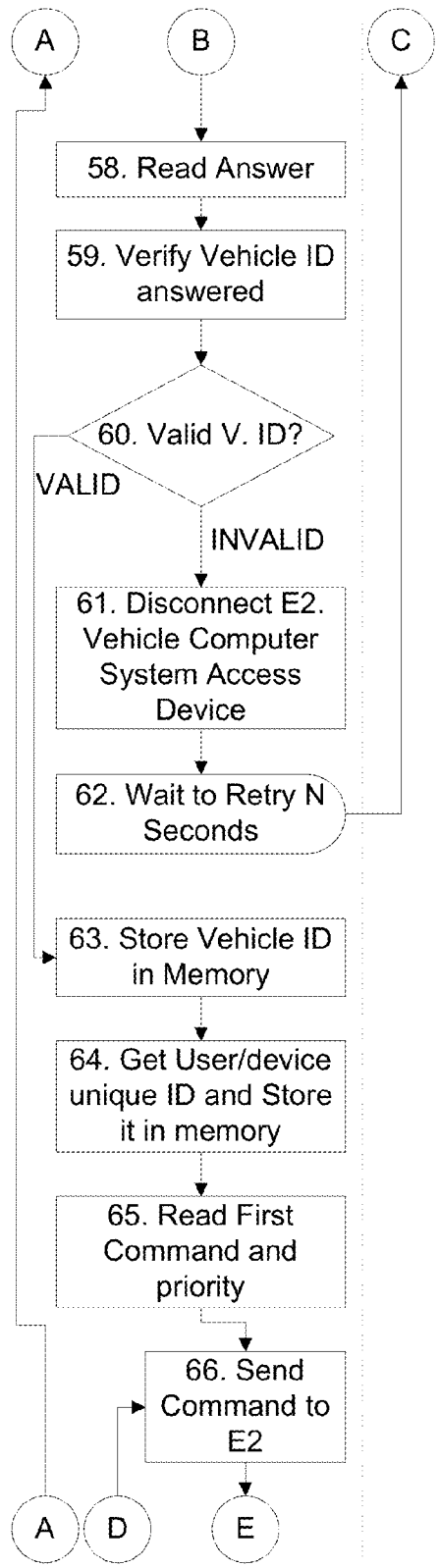
FIG. 3B is a continuation of the flowchart shown in FIG. 3A.
Figure 3C:
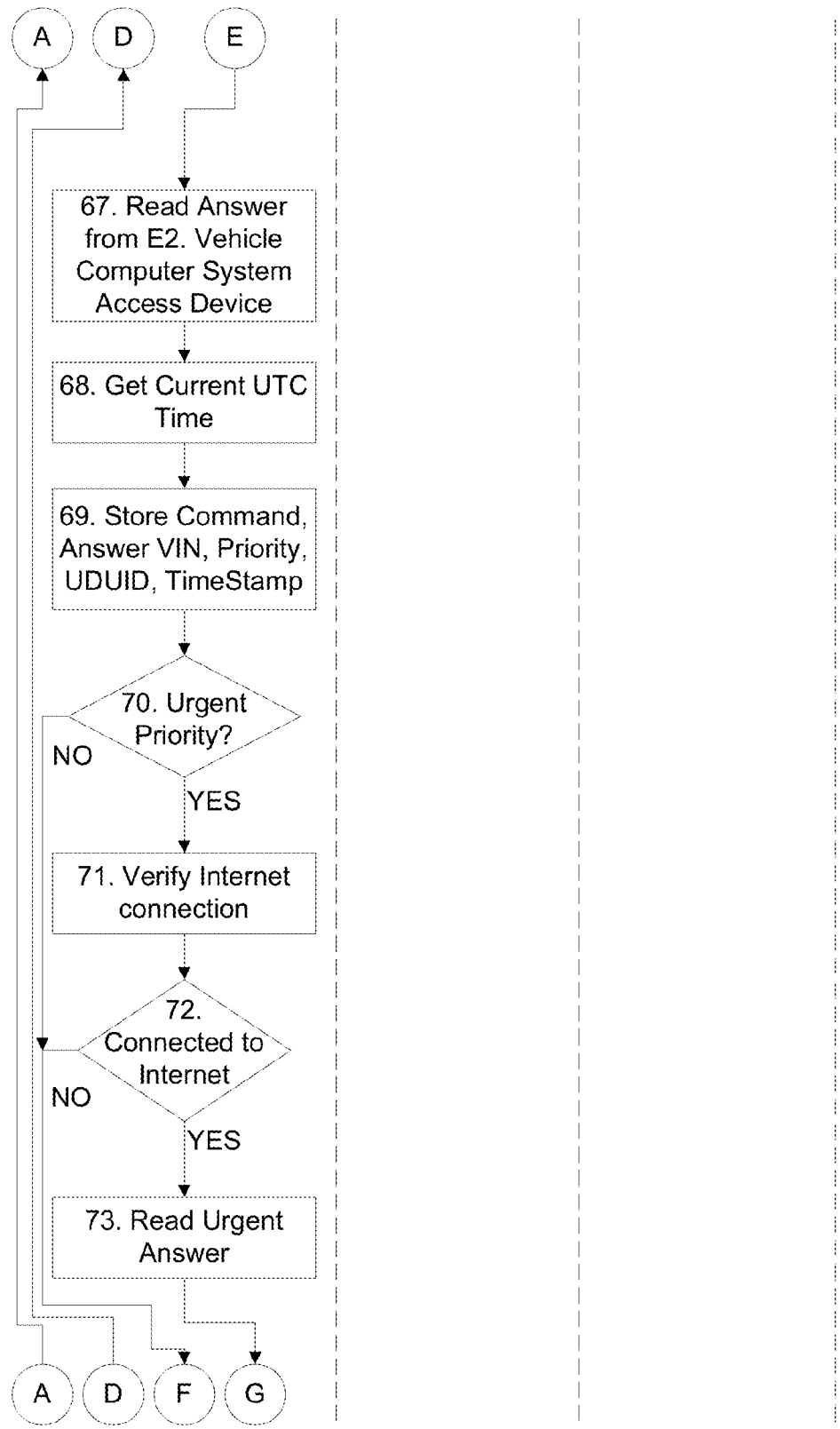
FIG. 3C is a continuation of the flowchart shown in FIG. 3B.
Figure 3D:
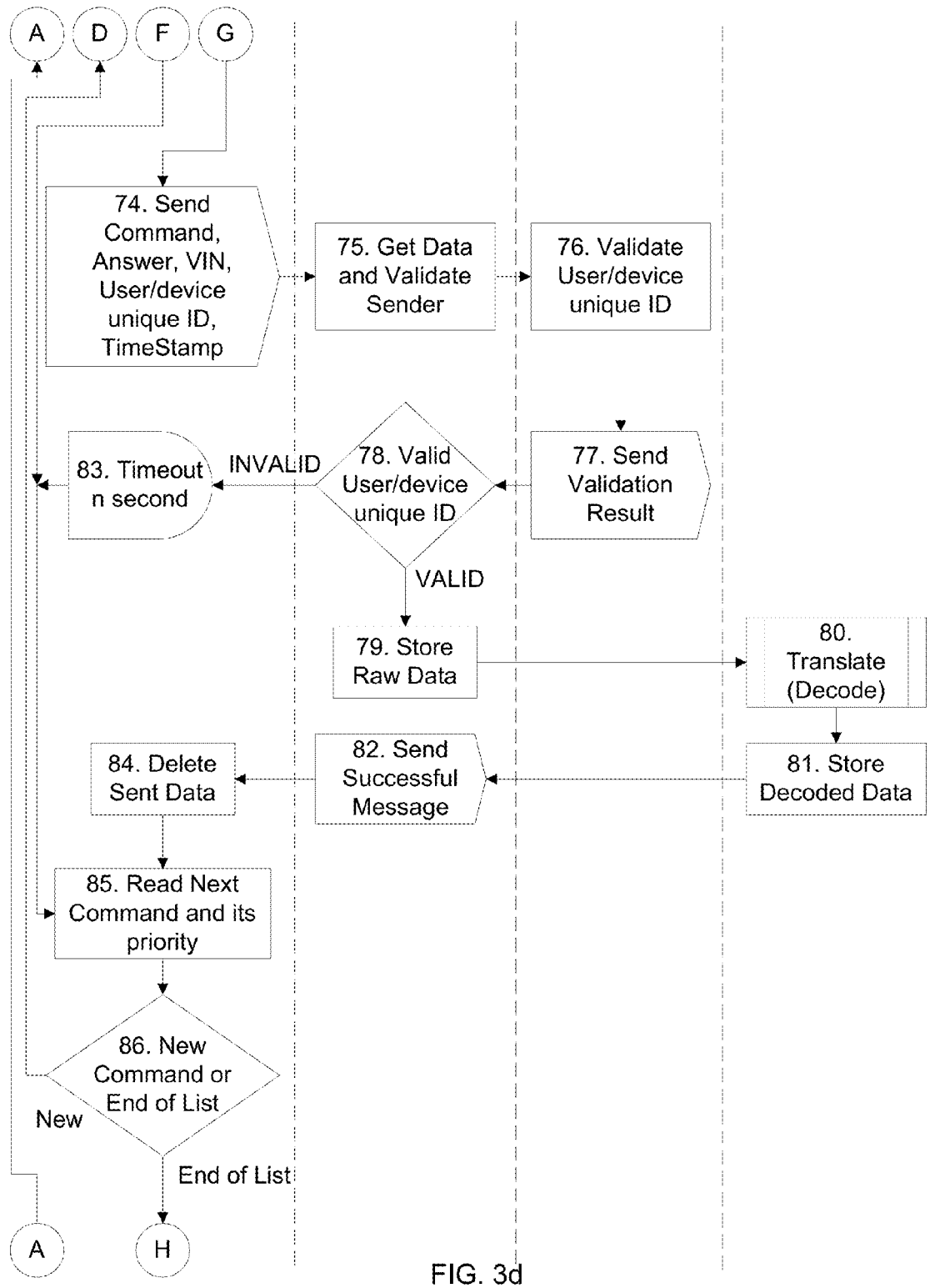
FIG. 3D is a continuation of the flowchart shown in FIG. 3C.
Figure 3E:
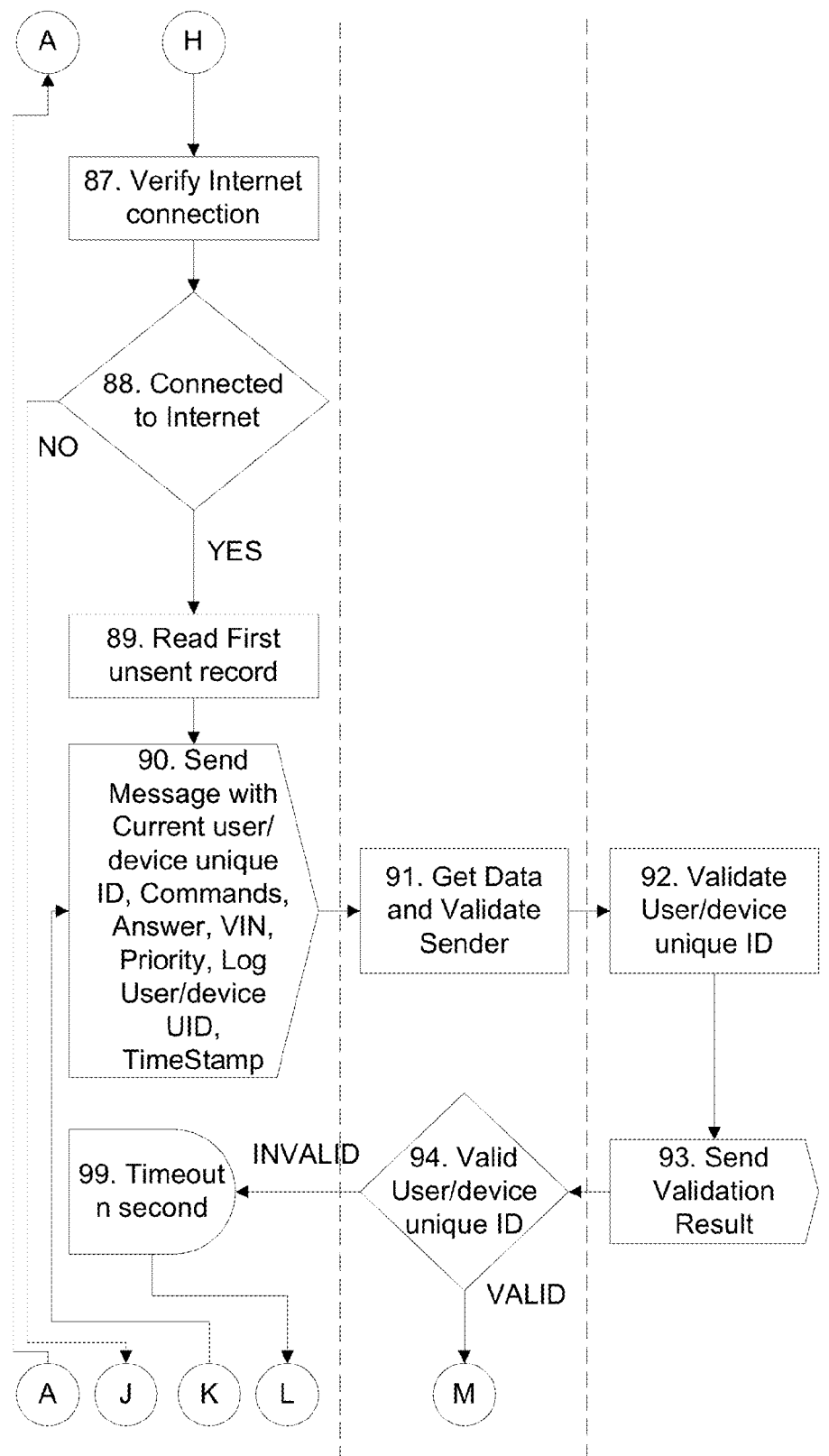
FIG. 3E is a continuation of the flowchart shown in FIG. 3D.
Figure 3F:
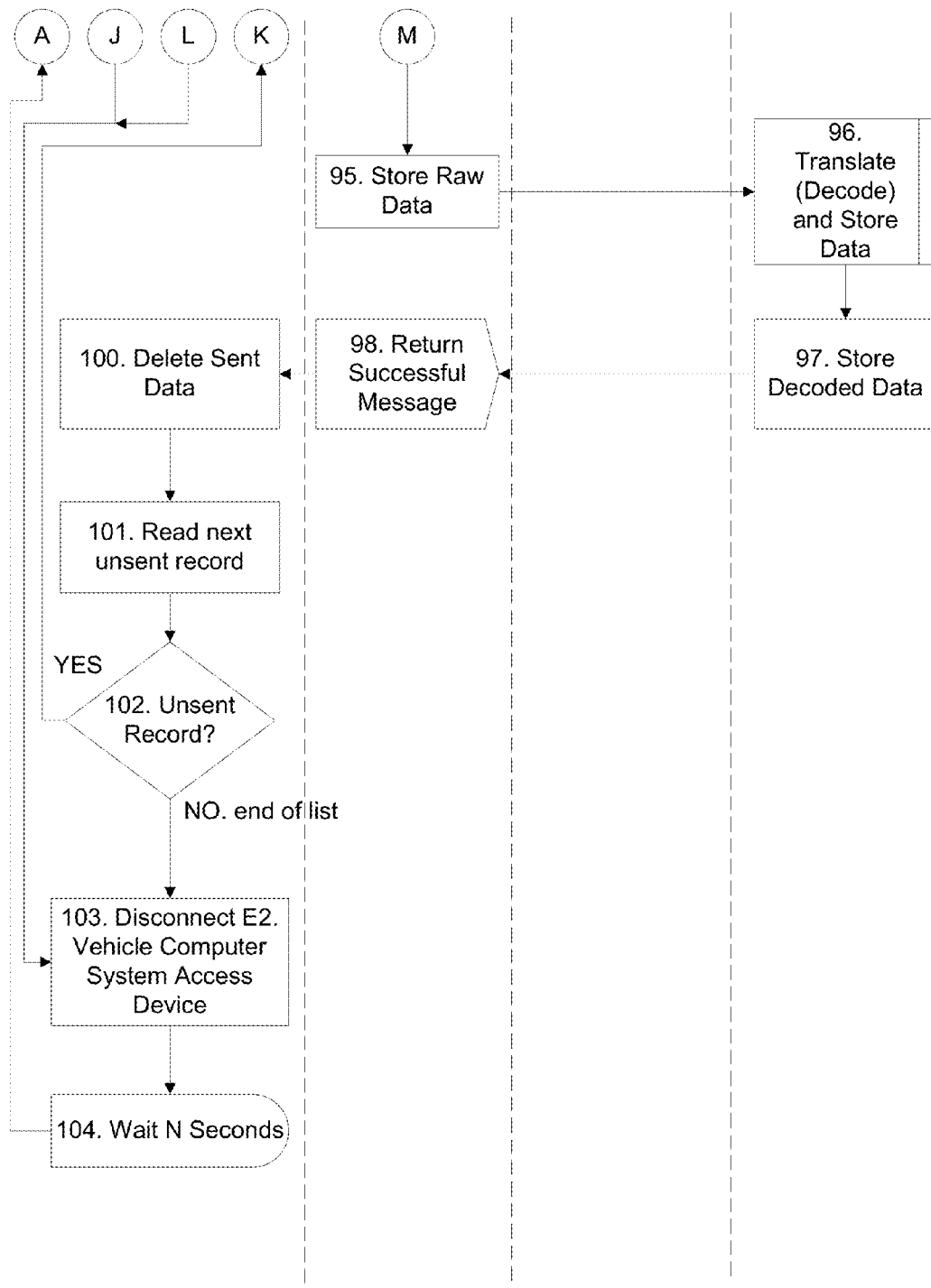
FIG. 3F is a continuation of the flowchart shown in FIG. 3E.
Figure 4A:
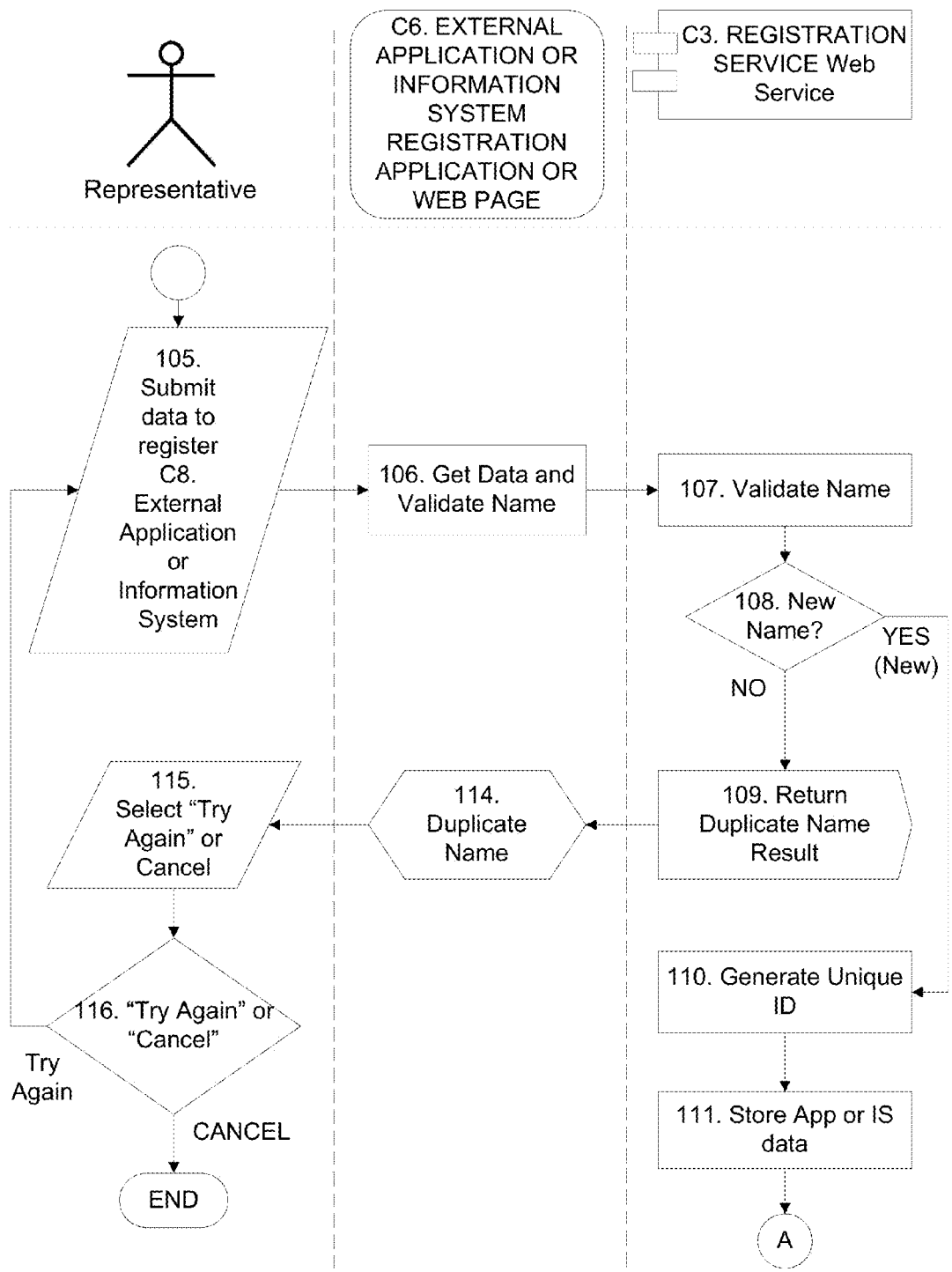
FIG. 4A is a flowchart outlining the data retrieval application or information system registration process for the present invention.
Figure 4B:
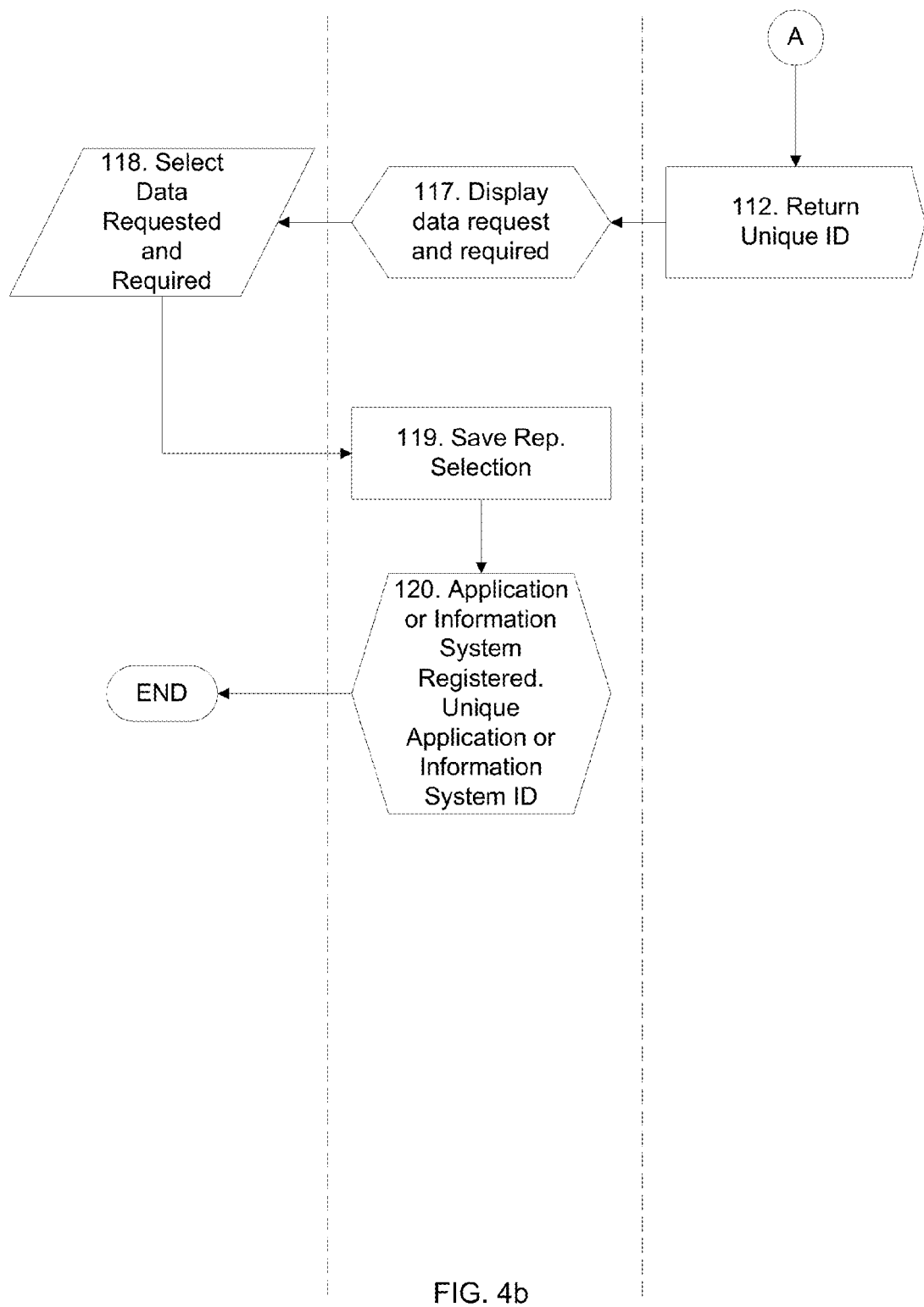
FIG. 4B is a continuation of the flowchart shown in FIG. 4A.
Figure 5A:
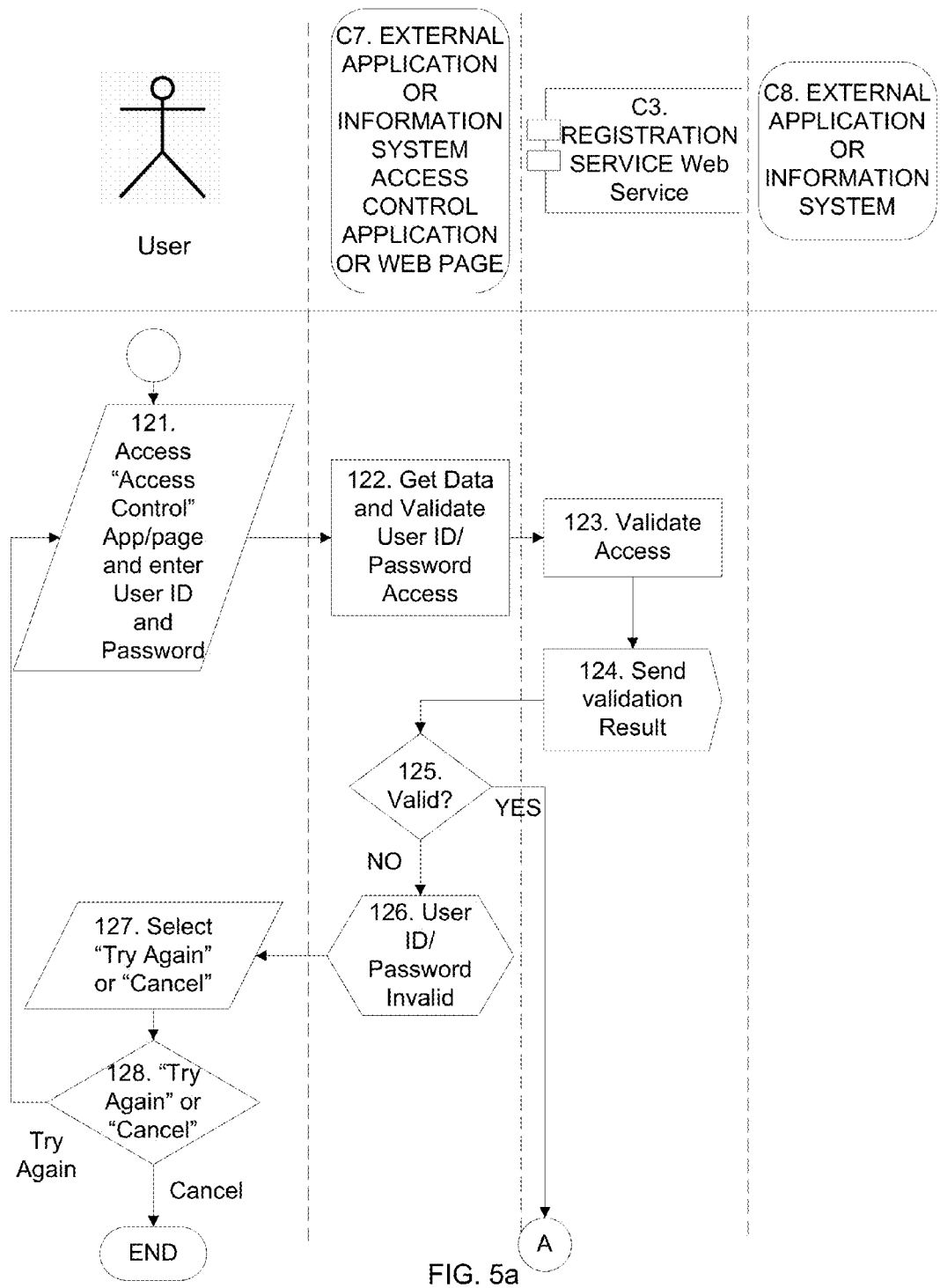
FIG. 5A is a flowchart outlining the user access control setup process for the present invention.
Figure 5B:
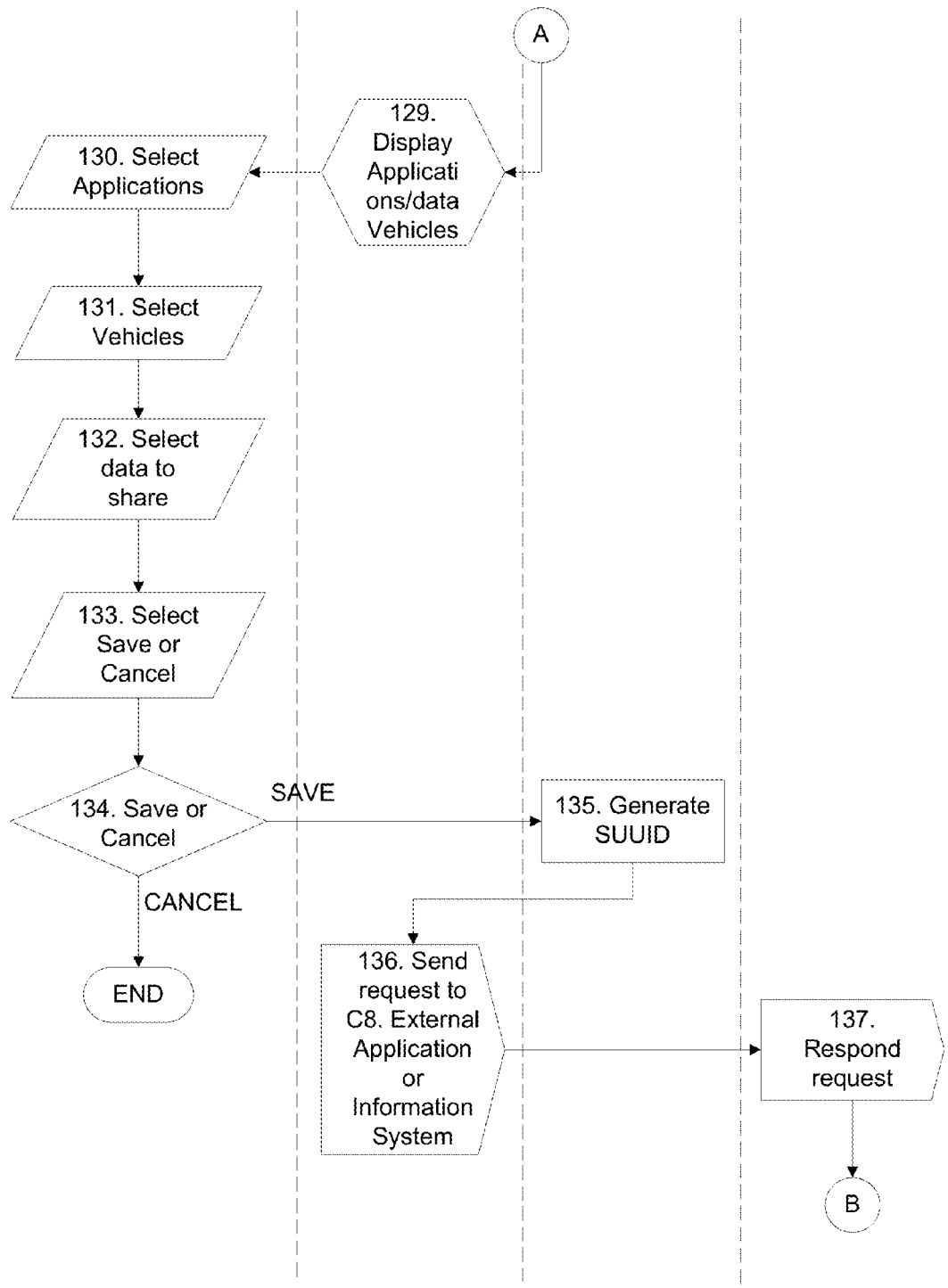
FIG. 5B is a continuation of the flowchart shown in FIG. 5A.
Figure 5C:
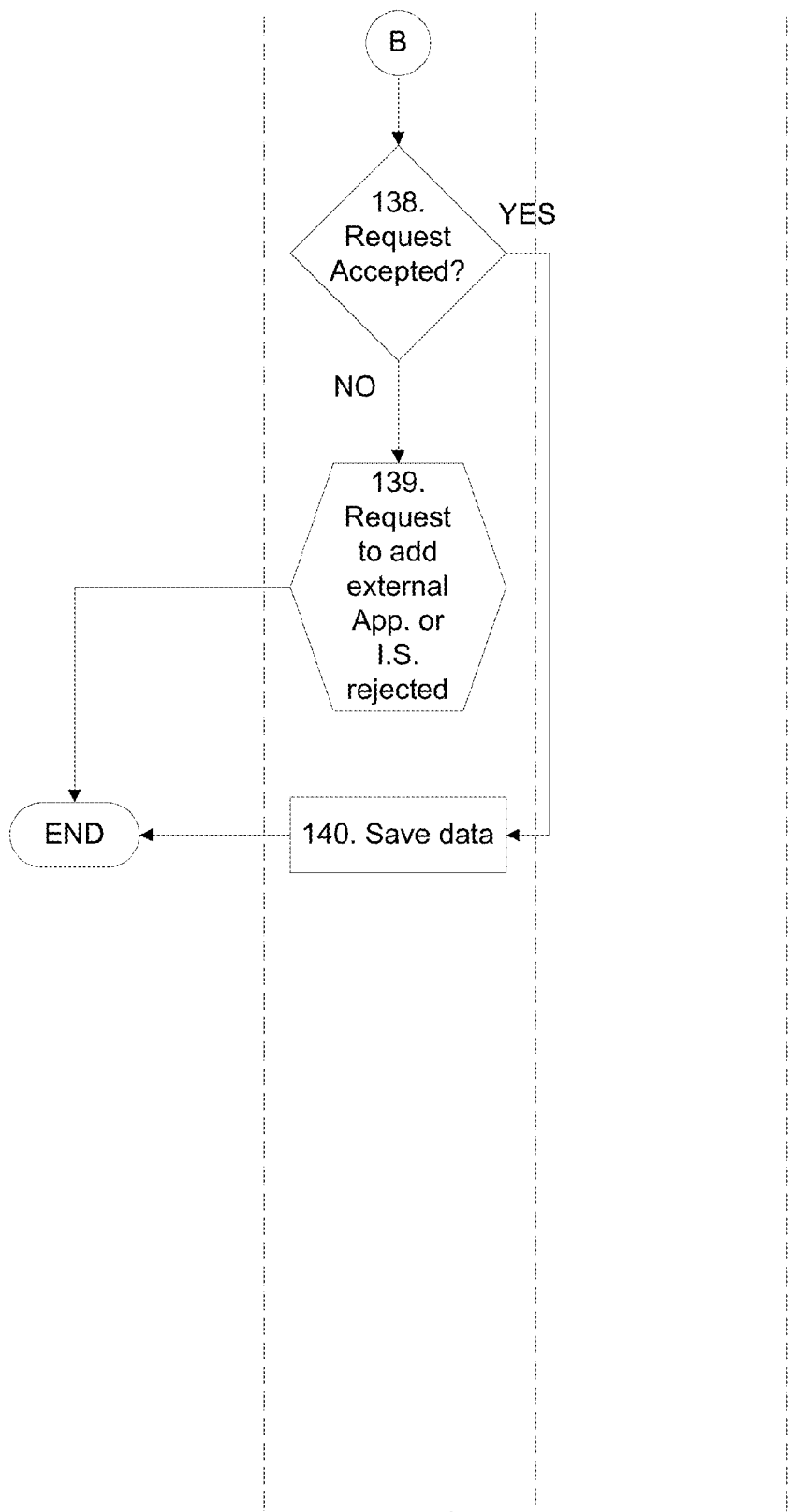
FIG. 5C is a continuation of the flowchart shown in FIG. 5B.
Figure 6A:
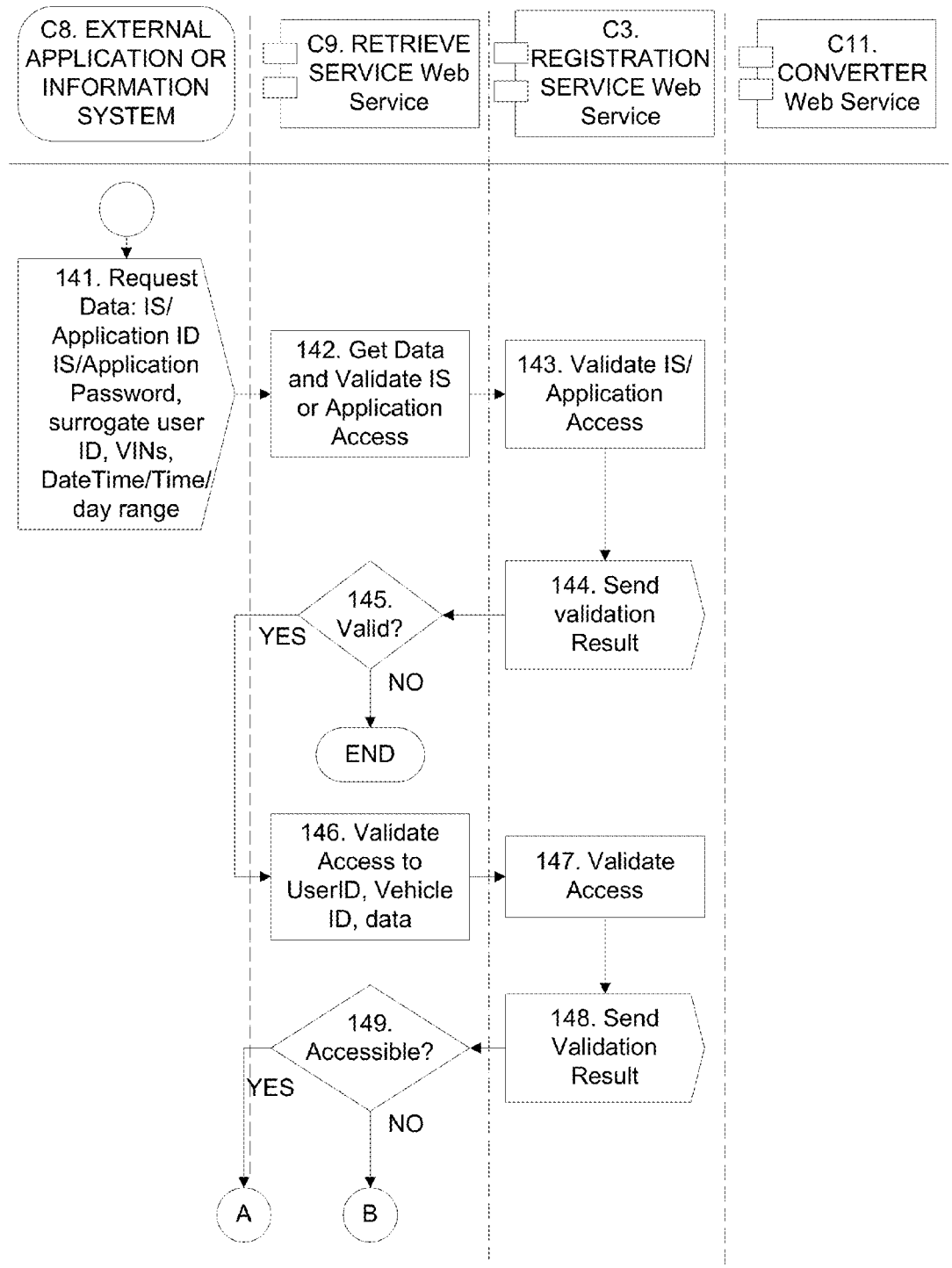
FIG. 6A is a flowchart outlining the data retrieval process for the present invention.
Figure 6B:
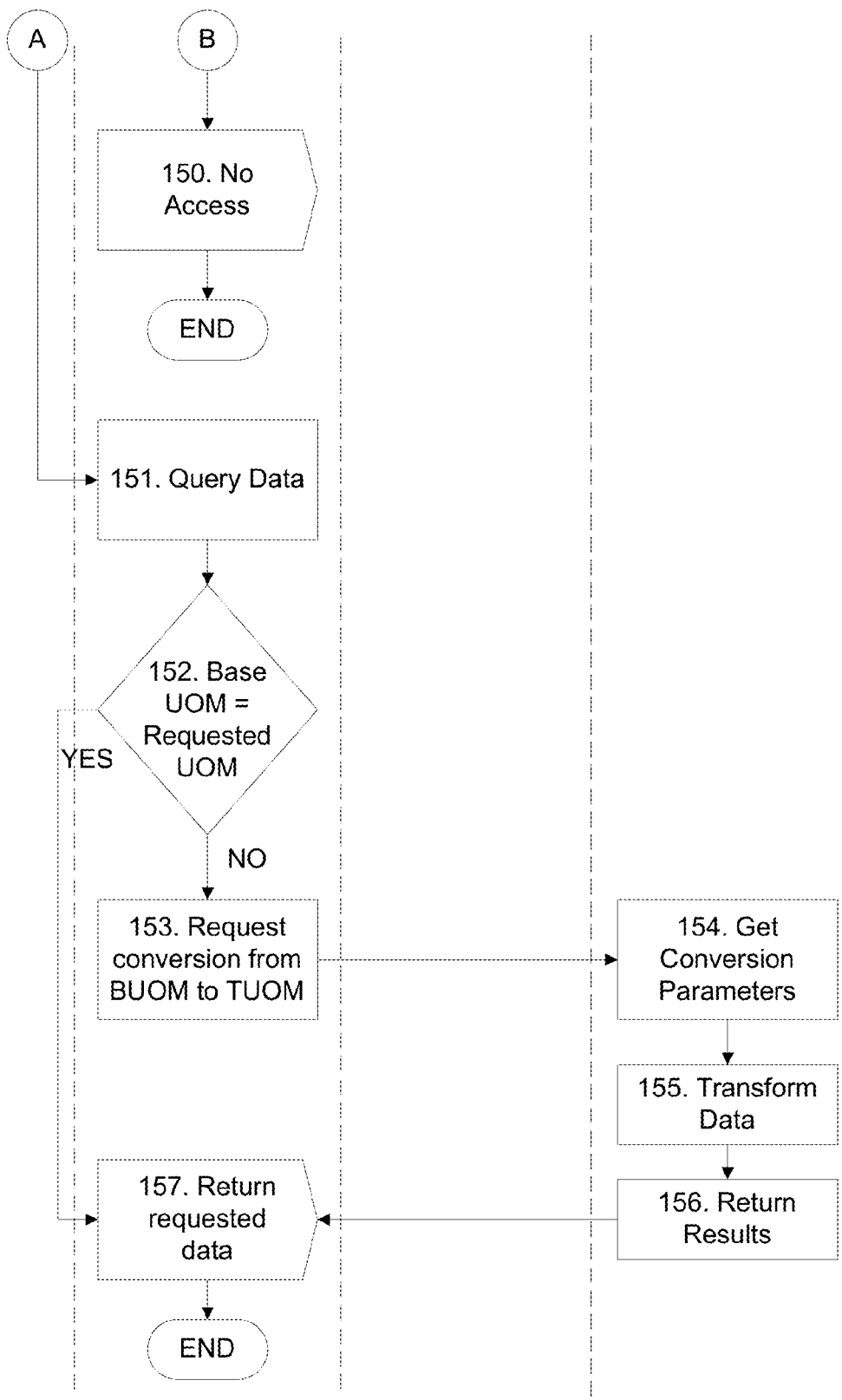
FIG. 6B is a continuation of the flowchart shown in FIG. 6A.
Figure 7:
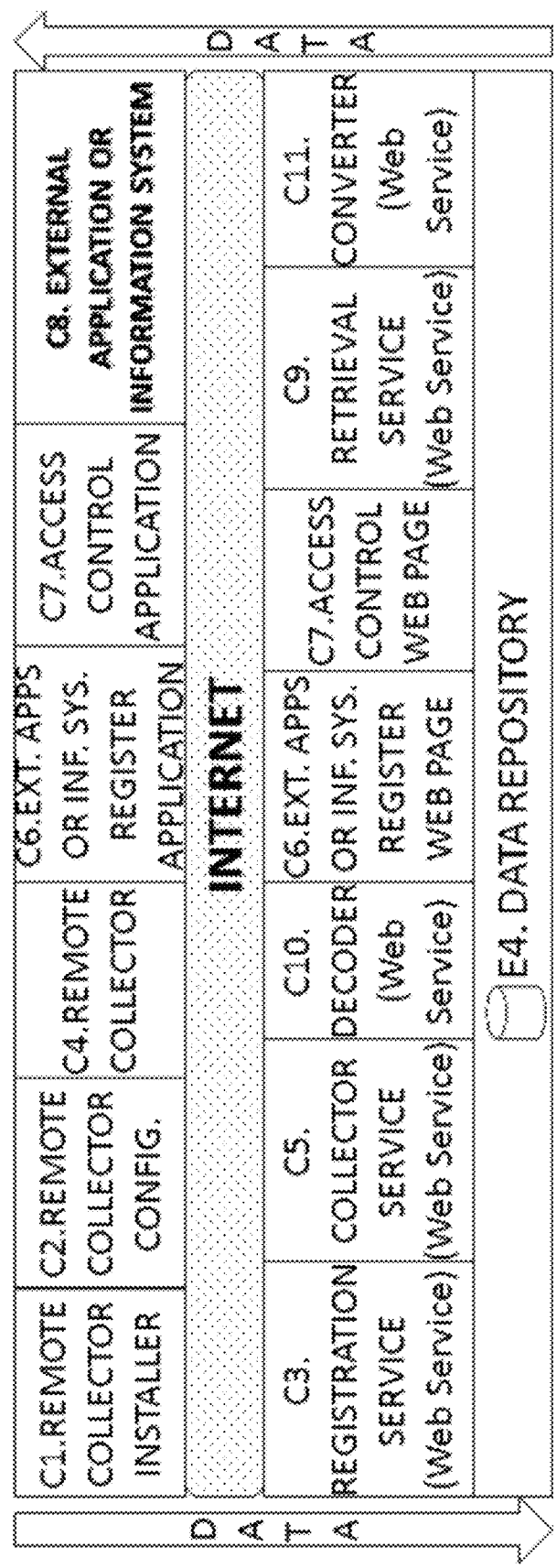
FIG. 7 is a block diagram depicting the components of the present invention.

The present invention provides a method and a system that allows the development of heterogeneous external applications or information systems C8 to provide vehicle-related information from vehicle related systems, with no knowledge of the vehicle language, how to connect, gather, decode (translate), or convert vehicle-related data. In the user access control setup process P5, the present invention allows data producers D4 to define what applications or information systems will access their data and what data is accessible by which of the applications or information systems. The present invention provides a framework to develop applications or information systems to retrieve standardized human understandable vehicle-related data in virtually any unit of measure by translating in servers all raw vehicle-related data. Such framework uses internet-enabled front end devices E3 massively available to individuals and business to gather and transmit data such as smart-phones, laptops, personal computer, etc. allowing virtually any individual or business to gather and store vehicle-related data. In the data gathering process P3, the present invention allows simultaneously multiple, scattered, and/or heterogeneous devices to gather vehicle-related data and to store that data in web server(s). In the data retrieval process P6, the present invention allows simultaneously multiple, scattered, and heterogeneous App/IS C8 previously registered to retrieve vehicle-related data in a standardized human understandable format using web services D3. In the data retrieval App/IS registration process P4, the present invention allows third parties (individuals or companies) to define an application or information system and to access user data and what information is accessible by this application or information system C8. FIG. 1 is an overview that depicts the general concept of the present invention.

DETAIL DESCRIPTIONS OF THE INVENTION

Lexicography and Terminology

The lexicography and terminology are used to describe the definitions (D), the elements (E), the components (C), and the processes (P) of the present invention.

D1. Application: A piece of software that allows a computer, a personal digital assistant (PDA), a smart-phone, or any computing device to perform specific tasks that is required by the user.

D2. Information Systems: The software and hardware systems that support data-intensive applications.

D3. Web Service: A software system designed to support interoperable machine-to-machine interaction over a network. Web services are externally available to other systems and the interaction with the Web service use messages, typically, but not necessary, conveyed using hypertext transfer protocol (HTTP) in conjunction with other Web-related standards. Web services can be used to integrate computer applications that are written in different languages and run on different platforms. Web services are language and platform independent.

D4. Data Producers: The person or a person on behalf of a company that uses the present invention to gather data, authorize external applications or information systems to retrieve it/his/her data, and uses external applications or information systems. A data producer D4 is also known as a user D5.

D5. User: a data producer D4. The user D5 can access web services through a specific user account from a plurality of user accounts, which are stored on the web server.

E1. Vehicle: Any device designed or used to transport people of cargo such as a car, a truck, or a motorcycle.

E2. Vehicle Computer System Access Device: An internal of external device of a vehicle that is capable of interacting with the computer systems or global positioning systems (GPS) of a vehicle E1 to request and provide vehicle related data, e.g. on-board diagnostic (OBD) scan tool. It can also be an internal of external device of a vehicle capable of providing the vehicle-related data such as an external GPS device.

E3. Internet-Enabled Front-End Device: Any computerized device cable to connect to the Internet by any system wired [e.g. Ethernet, universal serial bus (UBS)] or wireless [e.g. Wi-Fi, third generation mobile telecommunications technology (3G), fourth generation mobile telecommunications technology (4G), Bluetooth] at some point in time for a period of time or be permanently connected, such as a laptop, smart-phone, tablet personal computer, desktop personal computer, etc. Such devices E3 must also be capable to connect to the vehicle computer system access devices E2 and the Internet by any system wired (e.g. Ethernet, USB) or wireless (e.g. Wi-Fi, Bluetooth).

E4. Data Repository: a database or any form of file used to store data on a database server. Data repositories are used by a registration service web service C3, a collector service web service C5, and a remote collector application C4 to temporarily or permanently store data. Data repositories E4 are also used by the registration service web service C3, the collector service web service C5, the remote collector application C4, and a retrieve services web service C9 when reading or requesting data. There may be several repositories and several types of repositories (e.g. relational databases, text files, XML files).

C1. Remote Collector Installer: A specialized program that automates the work required to put the remote collector configuration C2 and the remote collector application C4 onto an Internet-enabled front-end device E3 so that the remote collector configuration C2 and the remote collector application C4 can be executed. The remote collector installer C1 creates the necessary directories, installs or copies the files for the remote collector configuration C2 and the remote collector application C4, stores initial data (such as a vehicle identification command, a list of data-gathering commands, and a location for web server), and requests and grants (if possible) permission to execute the installed software. The remote collector installer C1 ends the installation process by executing the remote collector configuration C2.

C2. Remote Collector Configuration: either an application or installer process that is executed to request user related data required to execute the remote collector application C4, for example user identification and user password. The remote collector configuration C2 also validates such data and requests a unique user and device identification using the registration service web service C3.

C3. Registration Service Web Service: Web service that gathers identification information from the users (register users) and the external application or information systems (App/IS) C8, generates unique App/IS identifications, generate unique user and device identifications, unique surrogate user identifications, authenticate user accounts, authenticate external App/IS C8, authenticate unique user and device identifications, authenticate unique surrogate user identifications, and validate access to some data such as access to a particular vehicle-related data from a particular user.

C4. Remote Collector Application: An application that run in an internet-enabled front-end device E3 in order to get data from the vehicle computer system access device E2, to locally store the data (data buffering), to transmit raw data to the collector service web service C5, and to delete the transmitted data once the collector service web service C5 confirms that the transmitted data was received. The remote collector application C4 automatically starts each time the internet-enabled front-end device E3 starts and is executed in the background (e.g. Windows or Android Service, or Linux/Unix init.d).

C5. Collector Service Web Service: Web Service that authenticates the remote collector application C4 requests via the registration service web service C3, receives and stores raw data (raw data buffer), decodes (translate) the raw answers to a standardized human understandable format using the decoder web service C10, and stores the decoded (translated) data within the database server E4. The collector service web service C5 responds to the remote collector application C4.

C6. External App/IS Registration Application/Webpage: The application/webpage C6 is used to request information of a new external App/IS C8, to validate that the new external App/IS C8 has not been registered before using the registration service web service C3, to store the new external App/IS C8, to display the new unique App/IS identification generated by the registration service web service C3, to request what data will be used by the external App/IS C8, and store that data. The webpage C6 would be hosted by a web server in the Internet or can be an application that is executed in any internet-enabled device that is connected the Internet.

C7. Access Control Application/Webpage: The application/webpage C7 that allows the user to define what external App/IS C8 has access to the data gathered by he/she/it. The webpage also allows defining what vehicles (one or more, or all) of the ones gathered an App/IS has access. Access to this application/webpage C7 and data is validated using registration service web service C3, providing the user identification and the user password. The page is hosted by a web server in the Internet or can be an application executed in an internet-enabled back-end device that is connected to the Internet.

C8. External Application or Information System: a third party product/service App/IS that is offered via the Internet and requests vehicle-related data by using the retrieve services web service C9. The user defines if the external App/IS C8 can access its/his/her data. The data that can be requested by an external App/IS C8 is controlled (limited) by the users. The purpose of the external App/IS C8 can be varied and target different problems or needs. The external App/IS C8 runs on an internet-enabled back-end device such as a mobile device (e.g. a mobile app), a PC/desktop, as a web application, or as a more complex information system running on servers.

C9. Retrieve Services Web Service: Web services that authenticate the external App/IS C8 requests via the registration service web service C3 and that answer to queries with standardized data in the requested unit of measure transforming answers to requested unit of measure if necessary using the converter web service C11.

C10. Decoder Web Service: Web service that decode or translate a raw answer from a vehicle to a base unit of measure such as volts, kilometers, etc. Web service then stores the decoded answer in the data repository E4.

C11. Converter Web Service: Web Service that convert from a base unit of measure to a target unit of measure. The definition is based on six parameters: a multiplier (M), a power input (Pi), a power output (Po), a sum input (Si), a sum output (So), and a quantity of the target unit of measure (T).

Parameters are stored in a database or file. The converter web service C11 gets a base unit of measure identification (BUOM), a quantity of the based unit of measure (Q), and a target unit of measure (TUOM). The converter web service C11 applies the following formula to convert to any unit of measure.

$$TUOM = \left\{ \frac{[(Q*M)+Si]^{Pi}+So}{T} \right\}^{Po}$$

An example parameter table is shown in Table 1 Conversion UOM Parameters.

TABLE 1

Conversion UOM Parameters

| BUOM | Multiplier | Power Input | Power Output | Sum Input | Sum Output | TUOM | Quantity of TUOM |
|------|-----------|-------------|--------------|-----------|------------|------|------------------|
| C | 1.8 | 1 | 1 | 0 | 32 | F | 1 |
| R | 1 | 1 | 1 | 0 | −491.67 | C | 1.7999986 |
| KPH | 0.62137119 | 1 | 1 | 0 | 0 | MPH | 1 |

A conversion example could be converting 40 degrees Celsius to degrees Fahrenheit. The BUOM is Celsius, and the TUOM is Fahrenheit. By querying Table 1 in order to find the conversion unit of measure parameters, the result is as follows.

$$\left\{ \frac{[(40*1.8)+0]^{1}+32}{1} \right\}^{1} = 104$$

Another example could be converting 563 degrees Rankin to degrees Celsius (R to C). Using Table 1, the result is as follows.

$$\left\{ \frac{[(563*1)+0]^{1}+-491.67}{1.7999986} \right\}^{1} = 39.62$$

P1. Remote Collector Installation Process: During this process (steps 1 to 3), the user executes the remote collector installer C1 in an internet-enabled front-end device E1, the remote collector installer C1 creates the necessary directories, installs the remote collector configuration C2 and the remote collector operation application files, stores initial data (such as the vehicle identification command, the list of data-gathering commands, and the location of the web server), and requests and grants (if possible) permissions to execute the installed software. The location of the web server can be internet protocol (IP) addresses or uniform resource locators (URL). Finally, the remote collector installer C1 executes the remote collector configuration C2 by starting the remote collector configuration process P2.

P2. Remote Collector Configuration Process: During this process (steps 4 to 51) executed in the internet-enabled front-end device E3, the remote collector configuration C2 detects the potential vehicle computer system access devices E2, allows the user to select one of the potential vehicle computer system access devices E2, and validates that the vehicle computer system access device E2 can gather vehicle-related data. If the vehicle computer system access device E2 can gather vehicle-related data, then the remote collector configuration C2 request the user identification and the user password in order to access the collector service web service C5 and to generate the unique user and device identification, which can be used later to identify the user that gathered the vehicle-related data. The validation of the user identification, the validation of the user password, and determining whether or not the user is a new user is performed in this process by using the registration service web service C3. The remote collector configuration process P2 can be executed on-demand several times after the first execution by the user in order to make changes to the remote collector configuration C2 if required.

P3. Data Gathering Process: The remote collector configuration process P2 starts this process for the first time (steps 52 to 104), and, afterwards, this process starts automatically each time the internet-enabled front-end device E3 is started or is on demand. This process is executed in the background (no user interface or user intervention is required). If the internet-enabled front-end device E3 is turned off or shut-down and then restarted later, the data gathering process P3 always starts in step 52 since the remote collector application C4 was configured to start automatically in step 50. The remote collector installation process P1 and the remote collector configuration process P2 are not necessary processes to restart the data gathering process P3 after the first time, but the remote collector installation process P1 and the remote collector configuration process P2 are necessary to start the data gathering process P3 for the first time. In this process, the remote collector application C4 reads the configuration information that is locally stored, connects to the vehicle computer system access devices E2, sends commands to the vehicle computer system access devices E2, reads responses from the vehicle computer system access devices E2, and temporarily stores the answers. The remote collector application C4 then sends the answer to the collector service web service C5, which uses the registration service web service C3 to validate the identity of the user that is sending the vehicle-related data. Finally, the remote collector application C4 deletes the records during this process when the collector service web service C5 confirms that the records have been received.

P4. Data Retrieval Application or Information System Registration Process: During this process (steps 105 to 120), a representative of the external App/IS (e.g. owner, employee) accesses the external App/IS registration application/webpage C6 in order to enter the new App/IS data. Each of the plurality of external App/IS C8 will be recognized by the present invention as a plurality of App/IS profiles. The representative will register and configure a specific App/IS profile with the registration service web service C6. The registration service web service C3 validates the information for the new external App/IS is unique so that the new external App/IS does not have the same name as any of the registered external App/IS. If the new external App/IS is unique, then the registration service web service C3 generates a unique identifier for the new external App/IS, store the unique identifier in the data repository E4, and responds to the acceptance to the new external App/IS with the unique identifier. Otherwise, the registration service web service C3 informs the duplicity to another external App/IS, and the representative is then given the option of reentering a new external App/IS data. Once the new external App/IS is validated, the representative selects what data that the new external App/IS will use and what data is required (mandatory) by the new external App/IS (see FIG. 10). Once the representative ends the selection process, the external App/IS registration application/webpage C6 will store the configuration defined by the representative.

P5. User Access Control Setup Process: During this process (steps 121 to 140), the user accesses the access control application/webpage C7, input their user identification and user password. The application/webpage validates the user identification and the user password with the registration service web service C3. If the user identification and the user password are invalid, then the user can reenter the user identification and the user password. If the user identification and the user password are valid, then the user can customize the external App/IS that can access their vehicle-related data and the vehicles available to a specific App/IS. These customizations are saved as the filter preferences for a particular user.

P6. Data Retrieval Process: During this process (steps 141 to 157), a specific external App/IS C8 sends a data request to the retrieve services web service C9, which validates the data request of the specific external App/IS C8 and enables access to the requested data via the registration service web service C3. If access is granted to the specific App/IS profile, then the specific external App/IS C8 retrieve the vehicle-related data from the data repository E4 and transform the vehicle-related data to the target unit of measure by using the converter web service C11. The answer to the data request is then sent to the specific external App/IS C8, which is being executed by an internet-enabled back-end device.

All illustrations of the drawings are for the purpose of describing selected versions of the present invention and are not intended to limit the scope of the present invention.

Figure 8:
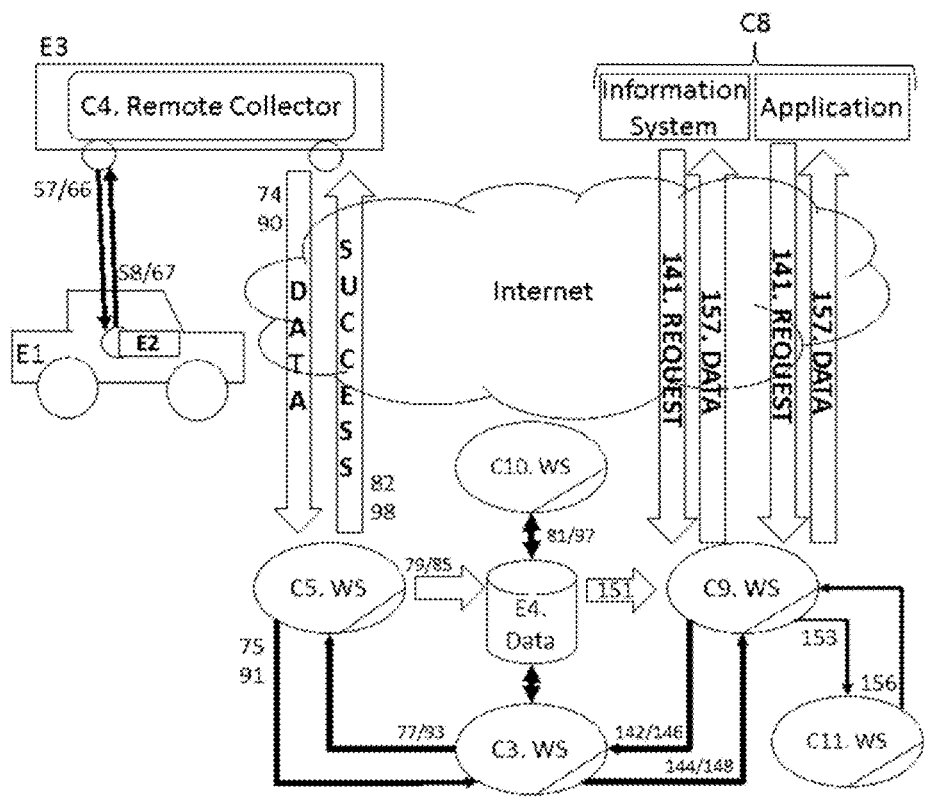
FIG. 8 is a schematic depicting the system overview of the present invention.

For the present invention, the data is gathered either from internal vehicle systems such as an OBD system, a vehicle GPS system, other external systems, or devices capable to provide vehicle-related data such as an external GPS unit, a phone compass, a video camera, etc. The data is gathered using a remote collector application C4 that is installed on an internet-enabled front-end device E3 (such as phones, smartphones, laptops, etc.) that is capable of connecting with the vehicle using an internal or external vehicle computer system access device E2 (such as OBD scan tools). The internet-enabled front-end device is communicably coupled with the vehicle computer system access device E2 through either wire or wireless connection. For example, the wire or wireless connection could be USB, Serial, Wi-Fi, or Bluetooth protocols. The data collected by the remote collector application C4 is stored in a data repository E4 using the web services D3 located on a web server(s) in the Internet. Access to the data repository E4 is controlled using a unique user and device identification. The data stored on the database server(s) is decoded or translated by the decoder web service C10 to a standardized human understandable form (a unit or measure such as volts, kilometers, or Celsius). That data is then shared with a plurality of App/IS C8 in accordance with the user's filter preferences that are determined during the user access control setup process P5 via web services. That data also is also converted into an alternate unit of measure if requested. The conversion to another unit of measure is performed by the converter web service C11. Access of the external App/IS C8 to retrieve data is controlled by using a unique App/IS identification and an App/IS password by the registration service web service C3. An example of an App/IS access control webpage is shown in FIG. 9. The user controls which of the plurality of App/IS C8 can access their data, and the user controls what data and what vehicle's data are shared with a specific App/IS C8. An overview of the system of the present invention is depicted in FIG. 8.

The present invention is used to allow multiple software developers to create any type of applications or information systems that uses vehicle-related data gathered from a plurality of users, vehicles, and devices. The users D5 control the access of these applications or information systems to their data. It is possible to develop an external App/IS C8 that access decoded (translated) vehicle-related data using web services with no knowledge of the vehicle language, how to connect to the vehicle, how to gather data from the vehicle, how to decode (translate) data or how to convert the data to another unit of measure if necessary. As can be seen in FIG. 9, the available data is still controlled by the user that defines via an access control application/webpage C7 which of the plurality of external App/IS C8 can access their data.

One of the unique aspects of the present invention is that the user can access a plurality of App/IS C8. A plurality of companies or individuals can develop a plurality of heterogeneous App/IS C8 in order to access and transform or process the data for different purposes. These companies or individuals can develop their applications or information systems define what data their applications or information systems request and require from the present invention. As can be seen in FIG. 9, the present invention allows the user to limit which of the plurality of App/IS C8 can access the user's data through the user access control setup process P5.

Another unique aspect of the present invention is that the system of the present invention allows a plurality of companies or individuals to develop a plurality of App/IS C8 in order to retrieve standardized human understandable vehicle-related data in virtually any unit of measure. These companies or individuals do not need any knowledge of the vehicle language and how to connect, gather, or decode (translate) the data in order to develop the plurality of App/IS C8. As can be seen in FIG. 10, the present invention allows companies or individuals that develop applications or information systems define what data their applications or information systems request and require (mandatory) from the present invention. The present invention provides a system to build other external application and information systems. The present invention also provides a session-less oriented method to transmit data gathered by the remote collector application C4 to the collector service web service C5, which is accomplished by transmitting the unique user and device identification and the vehicle identification each time during the data gathering process P3. The data stored during the data gathering process P3 is always identified by the unique user and device identification and the vehicle identification. The present invention also provides a method to control the access between the remote collector application C4 and the collector service web service C5 by using the unique user and device identification assigned by the system, which is accomplished through the data gathering process P3 via the registration service web server C3. The present invention also provides a method to control the access of a specific App/IS C8 using the unique application identification assigned by the system and an application password defined by the company or individual that registered the specific App/IS, which occurs during the data retrieval process P6 by the retrieve services web service C9 via the registration service web service C3. The present invention also provides a method to control the access of a specific App/IS C8 for the data defined by the user, which occurs during the data retrieval process P6 by the retrieve services web service C9 via the registration service web service C3. The present invention also provides the method to transform from a base unit of measure to multiple units of measure, which occurs during the data retrieval process P6 by the retrieve services web services C9 via the converter web services C11. The scope of the converter web service C11 can be used by any of the plurality of App/IS that requires the conversion between different units of measures. The present invention also provides a means of decoding raw data by the centralized web servers, which allows a small code footprint at the internet-enabled front-end device E3 and minimize the requirements (memory, permanent storage space, computational power, etc.) of an internet-enabled front-end device E3. This is accomplished through the data gathering process P3 by executing the decoder web service C10. The present invention provides a service for a plurality of App/IS C8 to retrieve the data without directly connecting a vehicle, requesting data from the vehicle, reading the request answer, decoding the answer, and converting the decoded answer to another unit of measure C9. The present invention is a method to mask the real user identification from the external App/IS C8 by using a unique surrogate user identification when sharing data with the external App/IS C8.

The present invention follows a process that describes the workflow of data from the plurality of vehicles through the remote controller application and the web services to the plurality of external App/IS. The preferred embodiment of the process is described in the following steps:

P1. Remote Collector Installation Process

1. The user D5 installs the remote collector application C4 in an Internet-enabled device such as smartphone, laptop, PC, etc. by running the remote collector installer application C1 (e.g. click install.exe or click install from the "market" site).

C1. Remote Collector Installer

2. The remote collector installer application C1 creates the necessary directories, stores the remote collector application operation files, stores initial data [such as Application identification, vehicle identification command (e.g. OBD command to get VIN is "0902"), a base list of data-gathering commands (e.g. OBD commands "010D", "0111", etc.) with priorities (e.g. Urgent=0, Normal=1, Low=2), location of web server(s) to contact in the Internet (e.g. collector server, time server, etc.), etc.], and requests and grants the necessary permissions to execute the remote collector application C4. Data stored in this step may be updated if necessary (e.g. adding another command to the list of data-gathering commands or updating the server address).
3. The remote collector installer application C4 starts the remote collector configuration process P2 (e.g. another application such as setup.exe or a subroutine in the remote collector installer application C4).

P2. Remote Collector Configuration Process

C2. Remote Collector Configuration

4. The remote collector configuration process P2 gathers the name and address (e.g. Bluetooth Address, Bluetooth URL, COM Port Number, MAC Address, IP Address, etc.) of all potential vehicle computer system access devices E2 such as OBD scan tools.
5. If the number of names and addresses gathered is one or more, then perform step 9, else perform the next step.
6. There are not names and addresses available: Display a message to inform that no devices were found and suggest possible solutions [such as "turn-on Bluetooth", "connect USB or Serial cable", "connect scan tool to the vehicle", or "start the vehicle"] and offer (display/ask) the following options: "retry" or "cancel (stop)". The user should be able to only select "retry" or "cancel".
7. Wait until then the user selects one option. Once an option is selected by the user, perform the next step.
8. If "Retry" is chosen, then perform step 4, else ("Cancel" is the only other option) STOP.
9. One or more names and addresses for the potential vehicle computer system access device gathered: Display and allow selecting one vehicle computer system access devices E2.
10. Wait until user select one device, and once a vehicle computer system access device E2 is selected, perform the next step.
11. Validate if the selected device is an vehicle computer system access device E2 by connecting to the vehicle computer system access device E2, sending one or more questions related to the vehicle, and verifying that the answer(s) to such question(s) are in the expected assortment of answers (e.g. when asking for the voltage using an AT command, the question is "atrv" and the answer should contain numbers ending with the letter "v", such as 11.5V)
12. If the device selected is a vehicle computer system access device E2, then perform step 16, else perform the next step.
13. Display a message informing that selected device is not a vehicle computer system access devices E2 and offer (display/ask) the following options: "try again" (verify the previously selected device again), "select another device", or "cancel (stop)". The user should be allowed to select the "try again", "select another device", or "cancel".
14. Wait until the user selects one option, once an option is selected, perform the next step.
15. If "try again" is selected, then perform the step 11. Else if "select another device" is chosen, then perform step 4. Else ("Cancel" is the only other option) STOP.
16. The selected device is a vehicle computer system access device E2: Get user identification data, asking the user to enter the following information (display the following questions): the user identification (e.g. Email), the user password, and if the user is a new user. Additional data may be requested.
17. Wait until the user enters requested data.
18. Verify that Internet connection is available through the worldwide network by contacting a web server on the Internet. For example, ping at least one of the addresses of one of the web servers of the application (e.g. one of the web servers stored in step 2) or get the time from an Internet time server.
19. If Internet connection is available, then perform step 23. Else perform next step.
20. No Internet connection is available: Display a message to connect to the Internet in order to continue. Suggest options [such as "turn on Wi-Fi", "connect Ethernet cable", "turn-on data connection"] and offer (display) the following options: "continue" or "cancel (stop)". The user should be allowed to select "continue" or "cancel (stop)".
21. Wait until the user select one option. Once an option is selected, perform next step.

22. If "continue" is chosen, then perform step 18. Else ("Cancel" is the only other option) STOP.
23. Get the user identification, the user password, and the new user data.
24. Request the validation of the user identification, the user password, and the new user data to the registration service web service C3. Invokes the user validation method using, for example, one of the addresses store into step 2 and sending an at least the following parameters: the user identification, the user password, and whether or not the user is a new user [e.g. registrationServiceValidateUser(userID, Password, newUser)].

C3. Registration Service Web Service

25. If the user is a new user, then perform step 34. Else perform the next step.
26. If the user is not a new user, then validate the user identification and the user password by querying the user repository [e.g. select count(*) from users where userID="My User ID" and password="My Password", valid if result/return is 1].
27. If the user identification and the user password is valid, then perform step 30. Else perform the next step.
28. Return INVALID (e.g. −1, "WRONG", "Invalid") to the remote collector configuration process P2.
29. Perform (go to) step 42.
30. Generate the unique user and device identification.
31. Store the unique user/device identification into the data repository E4.
32. Return VALID (e.g. 1, "OK", "Valid") and the unique user and device identification to the remote collector configuration process P2.
33. Perform (go to) step 42.
34. If the user is a new user, then validate that the user identification does not exist by querying the user repository [e.g. select count(*) from users where userID="My New User ID", is new user if result/return 0].
35. If the user identification already exists (it is not new), then perform step 41. Else perform the next step.
36. Store new user identification and new user password into user repository [e.g. insert into users (userID, password) values (NewUserID, NewPassword)].
37. Generate unique user and device identification.
38. Store the unique user and device identification into user repository.
39. Return VALID (e.g. 1, "OK", "Valid") and the unique user and device identification to the remote collector configuration process P2.
40. Perform (go to) step 42.
41. Return DUPLICATE (e.g. −100, "DUP", "Duplicate") to the remote collector configuration process P2 with the user identification message.

C2. Remote Collector Configuration

42. If validation return VALID, then perform step 49. Else if validation returns INVALID, then perform step 46. Else (DUPLICATE is the other option) perform the next step.
43. If the validation returns DUPLICATE, then display a message to inform that the user identification already exists, such that the user identification is not new. Display that the user identification cannot be used for the new user and offer (display/ask) the following options: "try again" or "cancel (STOP)". The user should be allowed to select "try again" or "cancel (STOP)".
44. Wait until the user select one option. Once an option is selected, then perform the next step.
45. If "try again" is selected, then perform step 16. Else ("cancel" is the only other option) STOP.
46. If the validation returns INVALID, then display a message to inform that the user identification or the user password entered is not correct and offer (display/ask) the following options: "try again" or "cancel (STOP)". The user should be allowed to select "try again" or "cancel (STOP)".
47. Wait until the user selects one option. Once an option is selected, perform the next step.
48. If "try again" is selected, then perform step 16. Else ("Cancel" is the only other option) STOP.
49. If the validation returns a VALID, then stores locally the unique user and device identification and the selected vehicle computer system access device address from step 10. This data may be updated later.
50. Setup the remote collector application C4 to start automatically in the background (e.g. a service in Windows or Android, or initd in Unix or Linux)
51. Start (rm) the remote collector application C4 in the background.

P3. Data Gathering Process

C4. Remote Collector Application

52. Retrieve (get/read) the vehicle computer system access device E2 address that was locally stored in step 49 (e.g. select CSAD_Address from LocalSqliteDBParameterTable).
53. Connect to the vehicle computer system access device E2 by using the address [e.g. CSAD_BTSocket.connect( )].
54. If connected to the vehicle computer system access device E2, then perform step 56. Else perform the next step.
55. If not connected to the vehicle computer system access device E2, then wait (delay/sleep) for N seconds (e.g. N in the range of 5 to 30 seconds is recommended, can be less or more), and then perform step 52.
56. If connected to the vehicle computer system access, then get (read) the command to retrieve the vehicle identification (e.g. "0902" to get VIN using OBD) that was stored in step 2 (e.g. select vin_command from LocalSqliteDBParameterTable).
57. Send the command to get vehicle identification to the vehicle computer system access device E2.
58. Read answer from the vehicle identification from the vehicle computer system access device E2.
59. Verify that if the vehicle identification is valid and not an empty answer (e.g. " "), an "Error", a "NO CONNECTION", a "No Data", or similar message that does not represent the vehicle identification from the vehicle computer system access device E2.
60. If the vehicle identification is VALID, then perform step 63. Else perform the next step.
61. If the vehicle identification is INVALID, then disconnect from the vehicle computer system access device E2.
62. Wait (delay/sleep) for N seconds (e.g. N in the range of 5 to 30 seconds is recommended, can be less or more), and then perform step 52.
63. Store the vehicle identification in the application variable memory [e.g. var, volatile memory, random access memory (RAM)].
64. Get the unique user and device identification that was stored in step 49 and stored it in application variable memory (e.g. var, volatile memory, RAM).

65. Get (read) the first command and its priority from the list of data-gathering commands stored in step 2.
66. Sends the command to the vehicle computer system access device E2.
67. Read the command answer from the vehicle computer system access device E2.
68. Get current coordinate universal time (UTC) and data for the timestamp.
69. Store the command, the command answer, the vehicle identification (from variable in the step 63), the unique user and device identification (stored in step 64), and the timestamp (from previous step) [e.g. insert into SQliteDBLogBufferTable (command, answer, yin, userID, TimeStamp) values (cmd, answer, userid, timestamp)]. All of the previous pieces of data are stored as a record.
70. If priority of the command is urgent, then perform the next step. Else perform step 85.
71. For an urgent command, verify that the internet connection is available by contacting a web server in the Internet. For example, ping at least one of the addresses of one of the web servers of the application (e.g. one of the servers stored in step 2 or get the time from an Internet time server).
72. If Internet connection is not available (worldwide network access is unavailable), then perform step 85. Else perform the next step.
73. Read last record stored that has urgent priority in step 69 (URGENT data/record)
74. Send unsent data (record from previous step) plus the unique user and device identification (stored in step 49) to the collector service web service C3. Invokes the stored raw data method by using, for example, one of the addresses stored in step 2 and sending at least the following parameters such as the current unique user and device identification, the executed command, the answer to the executed command, the vehicle identification, the unique user and device identification of the executed command, the timestamp [e.g. collectorService.storeRawData(MyUDUID, LogCommand, LogAnswer, LogVIN, LogUDUID, LogTiemStamp)].

C5. Collector Service Web Service

75. Validate access to store data for the unique user and device identification (e.g. MyUDUID) that sent the data. Request validation of the unique user and device identification to the registration service web service. Invoking the validation access method by sending at least the following parameters: the unique user and device identification [e.g. registrationService.validateUserAccess(MyUDUID)].

C3. Registration Service Web Service

76. Validate the unique user and device identification by querying the user/device repository [e.g. select count(*) from users where userdevID="MyUDUID", valid if result/return 1].
77. If the unique user and device identification is valid, then returns VALID (e.g. 1, "OK", "Valid") to the collector service web service C5. Else return INVALID (e.g. −1, "WRONG", "Invalid") to the collector service web service C5.

C5. Collector Service Web Service

78. If the unique user and device identification is VALID, then perform the next step. Else (ignore request) perform step 83.
79. Store the record as raw data, which includes the executed command, the answer to the executed command, the vehicle identification, the unique user and device identification of the executed command, the timestamp, the current time [e.g. insert into rawData (Command, Answer, VehicleIdentification, LogUDUID, TimeStamp, CurrentTime)values (LogCommand, LogAnswer, LogVIN, LogUDUID, LogTiemStamp, Now( ))].

C10. Decoder Web Service

80. Translate (Decode) the Answer from previous step to a standardized human understandable format in accordance to manufacturer or developer specifications. For example, if using OBD codes (e.g. ELM327) to ask for the engine coolant temperature, the command is "01 05" and the answer may look like "41 05 5A". The "41" of the answer shows that this is a response to a mode 1 request. The "05" shows the Parameter ID (PID) requested, in this case "05", and the 3A is the desired data. Converting the hexadecimal "5A" to decimal, we get 5×16+10=90 (A is 10 in hex). This represents the current temperature in degrees Celsius, but with a zero offset to allow for subzero temperatures. To convert to the actual coolant temperature, you need to subtract 40 from the value obtained. So the actual coolant temperature is 90-40=50° C.
81. Store translated (decoded) answer (e.g. 50 from previous example) with at least the following parameters: the executed command, the translated answer to the executed command, the vehicle identification, the unique user and device identification of the executed command, the timestamp, and the current time [(e.g. insert into DecodedData (Command, Answer, VehicleIdentification, UserDUID, TimeStamp)values (LogCommand, DecodedAnswer, LogVIN, LogUDUID, LogTiemStamp))].

C5. Collector Service Web Service

82. Return "SUCCESSFUL" to the remote collector application C4 and perform (go to) step 84.

C4. Remote Collector Application

83. Time Out: Wait (delay/sleep) for N seconds (e.g. N in the range of 5 to 30 seconds is recommended, can be less or more), then perform step 85.
84. Delete the sent data (the record/data already accepted and stored by the collector service web service C5).
85. Get (read) the next command and its priority from the list of data-gathering commands stored in step 2.
86. If a command is available (no end of list), then perform step 66. Else (no more commands available, it is the end of the list) perform the next step.
87. End of List: Verify that Internet connection is available by contacting a server in the Internet, for example, ping at least one of the addresses of one of the web servers of the application (e.g. one of the servers stored in step 2) or get the time from an Internet time server.
88. If Internet connection is not available (worldwide network access is unavailable), then perform step 103. Else perform the next step.
89. Read first unsent record available stored in the step 69 (unsent data/record) order by priority (urgent first) and longevity (older first).
90. Send unsent data (record from previous step) plus the unique user and device identification (stored in step 49) to the collector service web service C5. Invokes the store raw data method [e.g. collectorService.storeRawData(MyUDUID, LogCommand, LogAnswer, LogVIN, LogUserID, LogTiemStamp)].

C5. Collector Service Web Service

91. Validate Access to store data for the unique user and device identification (e.g. MyUDUID). Request validation of the unique user and device identification to the registration service web service C3. Invoking the validation access method and sending at least the following parameters: the unique user and device identification [e.g. registrationService.validateUserAccess(userdeviceUID)].

C3. Registration Service Web Service

92. Validate the User/device unique ID by querying the user/device repository (e.g. select count(*) from users where userdevID="UserDeviceUniqueID", valid if result/return 1).
93. If User/device unique ID is valid then return VALID (e.g. 1, "OK", "Valid") to "Collector Service", else return INVALID (e.g. −1, "WRONG", "Invalid") to "Collector Service".

C5. Collector Service Web Service

94. If the unique user and device identification is VALID, then perform the next step. Else (ignore request) perform step 99.
95. Store raw data of the executed command, the answer to the executed command, the vehicle identification, the unique user and device identification of the executed command, the timestamp, the current time [e.g. insert into rawData (Command, Answer, VehicleIdentification, UserDevID, TimeStamp, CurrentTime)values (LogCommand, LogAnswer, LogVIN, LogUDUID, LogTiemStamp, Now( ))].

C10. Decoder Web Service

96. Translate (Decode) the Answer from the previous step to a standardized human understandable format (see step 80 for an example).
97. Store the translated (decoded) answer with at least the following parameters: the executed command, the translated answer, the vehicle identification, the unique user and device identification of the executed command, the timestamp, the current time [e.g. insert into DecodedData (Command, Answer, VehicleIdentification, UserDevID, TimeStamp, CurrentTime)values (LogCommand, DecodedAnswer, LogVIN, LogUDUID, LogTiemStamp, Now( ))].
98. Return "SUCCESSFUL" to the remote collector application C4 and perform (go to) step 99.

C4. Remote Collector Application

99. Time Out: Wait (delay/sleep) for N seconds (e.g. N in the range of 5 to 30 seconds is recommended, can be less or more), and then perform step 101.
100. Delete sent data (record/data already accepted and stored by the collector service web service C5).
101. Read NEXT unsent record available stored in step 69 (unsent data/record)
102. If an unsent record is available (no end of list), then perform the step 90. Else (no more commands available, it is the end of the list) perform the next step.
103. Disconnect from the vehicle computer system access device E2.
104. Wait (delay/sleep) for N seconds (e.g. N in the range of 30 to 60 seconds is recommended, can be less or more), then perform step 52.

P4. Data Retrieval Application or Information System Registration Process

105. A representative of the external application or information system C8 (e.g. owner, employee) submits at least App/IS name, App/IS description, and App/IS password to register the application or information system via the external App/IS registration application/webpage C6. IP address(es) that will make the request(s) to the retrieve service web service C9 may be requested for added security. Additional information may be requested.

C6. External App/IS Registration Application/Webpage

106. The webpage request validation of App/IS and name data to the registration service web service C3. Invoking the application validation method sending at least the following parameters: the App/IS name, the App/IS description, and the App/IS password [e.g. registrationService.validateApplication(Name, Description, AppPassword)].

C3. Registration Service Web Service

107. Validate that the application name does not exists by querying the data repository E4 [e.g. select count(*) from applications where appName="New App Name", is new application name if result/return 0].
108. If the application name is new, then perform step 110. Else perform the next step.
109. Return duplicate application name error to the application or web page and perform step 114.
110. Generate a unique application or information system identification.
111. Store application data including unique application or information system identification [e.g. insert into application (AppPassword, Name, Description, UniqueID) values (appPassword, appName, appDescription, appUniqueID)].
112. Return the unique application or information system identification to the external App/IS registration application/webpage C6.

C6. External App/IS Registration Application/Webpage

113. Perform step 120.
114. For the duplicate of the application name: display an error message to inform that the application name already exists and offer (display) the following options "Try Again" or "Cancel (Stop)". Allow the user to select "Try Again" or "Cancel (Stop)"
115. Wait until the representative select one of the options. Once an option is selected, perform the next step.
116. If "Try Again" is selected, then perform step 105. Else (Cancel is the other option) STOP.
117. For an application name that is new, display data request and required screen.
118. Wait until the representative selects the data requested and required and submits the selection by pressing the save button for example.

119. Save the representative's selection of the data requested and required.
120. Display a message to inform that the application or information system was successfully registered and to show the unique application or information system identification.

P5. User Access Control Setup Process

121. The user access the access control application/webpage entering the user identification and the user password.

C7. External App/IS Access Control Application/Webpage

122. Validate access for the user identification and the user password [e.g. MyUserID, MyPassword] pair. Request validation of the user identification and the user password pair to the external App/IS registration application/webpage C6. Invoking the validation access method sending at least the following parameters: the user identification and the user password to the registration service web service C3. [e.g. registrationService.validateUserAccess(userID, Password)].

C3. Registration Service Web Service

123. Validate the user identification and the user password pair by querying the data repository E4 [e.g. select count(*) from users where userID="My User ID" and password="My Password", valid if result/return 1].
124. If the user identification and the user password pair is valid, then return VALID (e.g. 1, "OK", "Valid") to the access control App/IS application/webpage C7. Else return INVALID (e.g. −1, "WRONG", "Invalid") to the access control App/IS application/webpage C7.

C7. External App/IS Access Control Application/Webpage

125. If the user identification and the user password pair is VALID, then perform step 129. Else perform the next step.
126. If the validation returns INVALID, then the application/webpage C7 will display a message to inform that the user identification or the user password entered is not correct and will offer (display/ask) the following options: "Try Again" or "Cancel (STOP)". Allow the user to select "Try Again" or "Cancel (STOP)".
127. Wait until the user selects one of the options. Once an option is selected, then perform the next step.
128. If "Try Again" is selected, then perform step 121. Else ("Cancel" is the only other option) STOP.
129. If the user identification and the user password are valid, then display a list of available application/data and vehicles and allow the user to select (check) one or more to grant access to that user data.
130. The user selects allowable applications or information systems.
131. The user selects allowable vehicles. Per each allowable application that was checked (selected), the user has the option to select all the vehicles with data collected or to check specific allowable vehicles that he/she wants to share data.
132. The user selects the allowable records to share. Per each allowable application/vehicle that was checked (selected), the user has the option to select (check) to share all the data or some of the data requested by the allowable application.
133. Display the following options: "Save" or "Cancel (Stop)". Allow the user to choose and select "Save" or "Cancel (Stop)".
134. If "Save" is selected, then perform the next step. Else (Cancel is the other option) STOP.

C3. Registration Service Web Service

135. Generate a surrogate unique user identification for each allowable application that was checked (selected) by the user.

C7. External App/IS Access Control Application/Webpage

136. Send add new user request to the external App/IS C8 sending the surrogate unique user identification.

C8. External Application or Information System

137. Responds to the new user request.

C7. External App/IS Access Control Application/Webpage

138. If the new user request is accepted, then perform step 140. Else perform the next step.
139. Display a message to inform that the user request to add the application was rejected by the external App/IS C8, then STOP.
140. Save the user configuration with the options chosen in step 130, 131, and 132.

P6. Data Retrieval Process

C8. External Application or Information System

141. Sends a data request to the retrieve service web service C9 by invoking the get-data method using at least the following parameters: the unique App/IS identification, the application password, the unique surrogate user identification (the one to retrieve data to), the vehicle identification (e.g. VIN), the question, the unit of measure, the initial date/time, the end date/time (date range to get data), an optional time start, a time end (time range to get data), and optional day(s) of the week.

C9. Retrieve Services Web Service

142. Validates access with the unique App/IS identification and the application password [e.g. AppUniqueID, AppPassword]. Requests validation to the registration service web service by invoking the validation application access method sending at least the following parameters: the unique App/IS system and the application password [e.g. registrationService.validateAppAccess(AppUniqueID, Password)].

C3. Registration Service Web Service

143. Validates the unique App/IS identification and the application password by querying the data repository E4 [e.g. select count(*) from application where UniqueID="App Unique ID" and AppPassword="App Password", valid if result/return 1].
144. If the unique App/IS identification and the application password pair is valid, then return VALID (e.g. 1, "OK", "Valid") to the retrieve services web service C3. Else return INVALID [e.g. −1, "WRONG", "Invalid"] to the retrieve services web services C3.

C9. Retrieve Services Web Service

145. If the unique App/IS identification and the application password pair is VALID, then perform the next step. Else (ignore request) STOP.
146. Validates access to the user identification, the vehicle identification, and the requested data. Requests validation to the registration service web service C9 in order to invoke the validation for the data access method by sending at least the following parameters: the unique App/IS identification, the unique surrogate user identification (the one to retrieve data to), the vehicle identification (e.g. VIN), and the requested data identification (e.g. mpg, speed, etc).

C3. Registration Service Web Service

147. Validate the unique App/IS identification, the unique surrogate user identification (the one to retrieve data to), the vehicle identification (e.g. VIN), and the requested data identification by querying the data repository E4 for the user configuration [e.g. select count(*) from userConfiguration where UniqueAID="App Unique ID" and UserID="My Surrogate User ID" and VIN="My VIN" and dataID="My data ID", valid if result/return 1].
148. If the unique App/IS identification, the unique surrogate user identification (the one to retrieve data to), the vehicle identification (e.g. VIN), and the requested data identification group is accessible, then return VALID [e.g. 1, "OK", "Valid"] to the retrieve service web service C9. Else return INVALID [e.g. −1, "WRONG", "Invalid"] to the retrieve service web service C9.

C9. Retrieve Services Web Service

149. If the unique App/IS identification, the surrogate unique user identification (the one to retrieve data to), the vehicle identification (e.g. VIN), and the requested data group is ACCESSIBLE, then perform step 151. Else perform the next step.
150. Return a "no access to the unique surrogate user identification, the vehicle identification, or the requested data" error message to the external App/IS C8, then STOP.
151. Resolve the external App/IS C8 query by gathering data from all of the unique user and device identifications that are associated with the unique surrogate user identification using the user identification as a pivot [e.g. select command, answer, timestamp from DecodedData where UserDevID in (select userdevID from acct, surrogate, usrdev where and accounts=surrogateacct and accounts=userdevacct and surrogatekey=requestedsurrogatekey) and VIN="My VIN" and TimeStamp>=DataTimeInitial and TimeStap<=DateTimeEnd and dayofweek in (1,2)].
152. If default (based) unit of measure for the decoded retrieved data is different from the requested unit of measure (BUOM ≠ TUOM), then perform the next step. Else perform step 157.
153. Request conversion of unit of measure to the converter web service C11 by sending the based (default) unit of measure (BUOM), the quantity of based unit of measure, and the target unit of measure (TUOM).

C11. Converter Web Service

154. Get conversion parameter using BUOM and TUOM.
155. Transform the answer to the requested unit of measure using the formula: TUOM=((BUOM*Multiplier)^Power+SUM)/QTUOM
156. Return result to the retrieve services web services C9.

C9. Retrieve Services Web Service

157. Return the retrieved data from step 151 in the requested unit of measure per previous step if need to the external App/IS C8.

Although the invention has been explained in relation to its preferred embodiment, it is to be understood that many other possible modifications and variations can be made without departing from the spirit and scope of the invention as hereinafter claimed.

What is claimed is:

1. A system for retrieving, logging, and communicating vehicle-related data from each of a plurality of vehicles comprises, a plurality of vehicles; a worldwide network; an at least one web server, wherein said at least one web server executes a collector service, a registration service, a decoder service, a converter service, and a retrieve service; an at least one database server, wherein said at least one database server stores vehicle-related data for each of said plurality of vehicles; a plurality of internet-enabled back-end devices, wherein each of the plurality of internet-enabled back-end devices execute an external application or an information system; each of the plurality of vehicles includes a vehicle computer system access device and an at least one internet-enabled front-end device, wherein said vehicle computer system access device is capable of accessing vehicle-related data and said at least one internet-enabled front-end device executes a passive retrieving application; said vehicle computer system access device being communicably coupled to said at least one internet-enabled front-end device; said at least one internet-enabled front-end device being communicably coupled to said at least one web server through said worldwide network; said at least one web server being communicably coupled to said at least one database server; and each of said plurality of internet-enabled back-end devices being communicably coupled to said at least one web server through said worldwide network and for remotely collecting vehicle-related data from each of a plurality of vehicles and sending the vehicle-related data to a plurality of internet-enabled back-end devices by executing computer-executable instructions stored on a non-transitory computer-readable medium, the method comprises the steps of: converting said corresponding records into said requested units of measure by computing equation:

$$TUOM=(\{[Q*M]+S_i\}^{P_i+S_o}/T)^{P_o}$$

wherein TUOM is target unit of measure, Q is base unit of measure, M is a multiplier, $S_i$ is sum input, $S_o$ is sum output, $P_i$ is power input, and $P_o$ is power output, T is quantity of target unit of measurement.

2. A method for retrieving vehicle-related data from a specific vehicle and sending the vehicle-related data to a web server through an internet-enabled front-end device by executing computer-executable instructions stored on a non-transitory computer-readable medium, the method comprises the steps of: providing a specific vehicle, wherein said specific vehicle includes a vehicle computer system access device; providing a specific internet-enabled front-end device, a worldwide network, and an at least one web server; installing an application infrastructure onto said specific internet-enabled front-end device, wherein said application infrastructure includes necessary application directories, application operation files, initial data, and necessary permissions; configuring a plurality of application settings for said specific internet-enabled front-end device; remotely collecting vehicle-related data by sending test commands to said vehicle computer system access device and by receiving command answers from said vehicle computer system access device; initially accessing a specific user account on said at least one web server by sending a user identification and a user password for said specific user account; associating said vehicle-related data to a unique user and device identification, wherein said unique user and device identification represents both said specific user account and said specific internet-based front-end device; and continuously sending said vehicle-related data to said at least one web server and for remotely collecting vehicle-related data from each of a plurality of vehicles and sending the vehicle-related data to a plurality of internet-enabled back-end devices by executing computer-executable instructions stored on a non-transitory computer-readable medium, the method comprises the steps of: converting said corresponding records into said requested units of measure by computing equation:

$$TUOM = (\{[Q^*M] + Si\}^{Pi+So}/T)^{Po}$$

wherein TUOM is target unit of measure, Q is base unit of measure, M is a multiplier, $S_i$ is sum input, $S_o$ is sum output, $P_i$ is power input, and $P_o$ is power output, T is quantity of target unit of measurement.

3. The method for retrieving vehicle-related data from a specific vehicle and sending the vehicle-related data to a web server through an internet-enabled front-end device by executing computer-executable instructions stored on a non-transitory computer-readable medium, the method as claimed in claim 1 comprises the steps of: creating said necessary application directories on said specific internet-enabled front-end device; storing said application operation files within said necessary application directories and implementing said application operation files in order to collect said vehicle-related data from said specific vehicle; storing said initial data within said necessary application directories; and requesting and receiving said necessary permissions from said specific internet-enabled front-end device in order to collect said vehicle-related data from said vehicle computer system access device.

4. The method for retrieving vehicle-related data from a specific vehicle and sending the vehicle-related data to a web server through an internet-enabled front-end device by executing computer-executable instructions stored on a non-transitory computer-readable medium, the method as claimed in claim 1 comprises the steps of: locating and identifying potential vehicle computer system access device within immediate area of said specific vehicle; sending a confirmation request to said potential vehicle computer system access device; verifying said potential vehicle computer system access device as said vehicle computer system access device of said specific vehicle by receiving a confirmation response from said potential vehicle computer system access device; suggesting options in order to locate said vehicle computer system access device of said specific vehicle, if said potential vehicle computer system access device does not send said confirmation response; verifying availability of said worldwide network in order to communicate with said at least one web server; prompting to enter said user identification and said password in order to access said specific user account; executing a registration process in order to create a new user account with said user identification and said password, if said specific user account does not exist on said at least one web server; and receiving said unique user and device identification from said at least one web server.

5. The method for retrieving vehicle-related data from a specific vehicle and sending the vehicle-related data to a web server through an internet-enabled front-end device by executing computer-executable instructions stored on a non-transitory computer-readable medium, the method as claimed in claim 1 comprises the steps of: providing a vehicle identification command, a plurality of data-gathering commands, and location of said at least one web server within said initial data, wherein each of said plurality of data-gathering commands includes a priority rank; retrieving a vehicle identification number (VIN) for said specific vehicle by sending said vehicle identification command to said vehicle computer system access device; sequentially sending each of said plurality of data-gathering commands to said vehicle computer system access device; retrieving a command answer for each of said plurality of data-gathering commands; retrieving coordinated universal time (UTC) in order to create a timestamp for each of said plurality of data-gathering commands; sequentially creating a plurality of records, wherein each of said plurality of records includes a specific command from said plurality of data-gathering commands, said command answer for said specific command, said priority rank, said unique user and device identification, said VIN, and said timestamp; and sequentially sending each of said plurality of records to said at least one web server.

6. The method for retrieving vehicle-related data from a specific vehicle and sending the vehicle-related data to a web server through an internet-enabled front-end device by executing computer-executable instructions stored on a non-transitory computer-readable medium, the method as claimed in claim 5 comprises the steps of: immediately verifying availability of said worldwide network in order to communicate with said at least one web server, if said priority rank of a specific record from said plurality of records is urgent; sending said specific record to said at least one website; and deleting said specific record from said plurality of records, if a successfully-stored message for said specific record is received from said at least one web server.

7. The method for retrieving vehicle-related data from a specific vehicle and sending the vehicle-related data to a web server through an internet-enabled front-end device by executing computer-executable instructions stored on a non-transitory computer-readable medium, the method as claimed in claim 5 comprises the steps of: passively verifying availability of said worldwide network in order to communicate with said at least one web server, if said priority rank of a specific record from said plurality of records is normal or low; sending said specific record to said at least one website; and deleting said specific record from said plurality of records, if a successfully-stored message for said specific record is received from said at least one web server.

8. A method for remotely collecting vehicle-related data from each of a plurality of vehicles and sending the vehicle-related data to a plurality of internet-enabled back-end devices by executing computer-executable instructions stored on a non-transitory computer-readable medium, the method comprises the steps of: providing an at least one web server and a database server; providing a plurality of vehicles, wherein each of said plurality of vehicles includes an at least one internet-enabled front-end device; providing a plurality of user accounts, wherein each of said plurality of user accounts includes a user identification and a user password; remotely collecting a plurality of records from said at least one internet-enabled front-end device for each of said plurality of vehicles, wherein each of said plurality of records includes a specific command, a command answer for said specific command, a priority rank, a unique user and device identification, a vehicle identification number (VIN), and a timestamp; registering and configuring a plurality of external application/information system (App/IS) profiles, wherein said plurality of external App/IS profiles is accessed by a plurality of internet-enabled back-end devices; limiting accessibility between said plurality of user accounts and said plurality of external App/IS profiles by setting filter preferences for each of said plurality of user accounts; and enabling said plurality of back-end devices to access said plurality of records for each of said plurality of vehicles through said plurality of external App/IS profiles and for remotely collecting vehicle-related data from each of a plurality of vehicles and sending the vehicle-related data to a plurality of internet-enabled back-end devices by executing computer-executable instructions stored on a non-transitory computer-readable medium, the method comprises the steps of: converting said corresponding records into said requested units of measure by computing equation:

$$TUOM=(\{[Q*M]+Si].sup.Pi+So\}/T).sup.Po$$

wherein TUOM is target unit of measure, Q is base unit of measure, M is a multiplier, $S_i$ is sum input, $S_o$ is sum output, $P_i$ is power input, and $P_o$ is power output, T is quantity of target unit of measurement.

9. The method for remotely collecting vehicle-related data from each of a plurality of vehicles and sending the vehicle-related data to a plurality of internet-enabled back-end devices by executing computer-executable instructions stored on a non-transitory computer-readable medium, the method as claimed in claim 1 comprises the steps of: receiving a specific record from said at least one internet-enabled front-end device, wherein said specific record includes said specific command, said command answer for said specific command, said priority rank, said unique user and device identification, said VIN, and said timestamp; verifying said unique user and device identification for a specific user account from said plurality of user accounts; storing said specific record as raw data on said database server, if said unique user and device identification correctly match said specific user account; decoding said specific record into a standardized human understandable format; storing said specific record as decoded data on said database server; and sending a successfully-stored message to said at least one internet-enabled front-end device.

10. The method for remotely collecting vehicle-related data from each of a plurality of vehicles and sending the vehicle-related data to a plurality of internet-enabled back-end devices by executing computer-executable instructions stored on a non-transitory computer-readable medium, the method as claimed in claim 1 comprises the steps of: receiving an App/IS name, an App/IS description, and an App/IS password for a new App/IS profile through said at least one web server; searching for said App/IS name of said new App/IS profile amongst said plurality of external App/IS profiles; prompting to reenter said App/IS name of said new App/IS profile until said App/IS name of said new App/IS profile is unique amongst said plurality of external App/IS profiles; generating an App/IS identification for said new App/IS profile, wherein said App/IS identification for said new App/IS profile is unique amongst said plurality of external App/IS profiles; storing said App/IS name, said App/IS description, said App/IS identification, and said App/IS password for said new App/IS profile on said database server; and displaying a successfully-registered message through said at least one web server, wherein said successfully-registered message includes said App/IS identification of said new App/IS profile.

11. The method for remotely collecting vehicle-related data from each of a plurality of vehicles and sending the vehicle-related data to a plurality of internet-enabled back-end devices by executing computer-executable instructions stored on a non-transitory computer-readable medium, the method as claimed in claim 1 comprises the steps of: wherein a specific user account from said plurality of user accounts is associated with an at least one vehicle from said plurality of vehicles; prompting to enter said user identification and said user password for said specific user account; displaying said at least one vehicle with said plurality of records for each of said plurality of external App/IS profiles through said web server, if said user identification and said user password correctly match said specific user account; prompting said specific user account to select allowable App/IS profiles from said of plurality of external App/IS profiles, wherein said allowable App/IS are exclusively able to retrieve decoded data of said specific user account; prompting said specific user account to select allowable vehicles from said at least one vehicle, wherein said allowable App/IS profiles are only able to access said decoded data of said allowable vehicles; prompting said specific user account to select allowable records from said plurality of records, wherein said allowable App/IS profiles are only able to access said decoded data of said allowable records; generating a unique surrogate user identification for each of said allowable App/IS profiles, wherein said unique surrogate user identification is sent to said allowable App/IS profiles; and storing said allowable App/IS profiles, said allowable vehicles, said allowable records, and said unique surrogate user identification as said filter preferences for said specific user account.

12. The method for remotely collecting vehicle-related data from each of a plurality of vehicles and sending the vehicle-related data to a plurality of internet-enabled back-end devices by executing computer-executable instructions stored on a non-transitory computer-readable medium, the method as claimed in claim 1 comprises the steps of: receiving a data request from a specific App/IS profile, wherein said data request includes an App/IS identification, an App/IS password, said unique surrogate user identification, an at least one chosen VIN, a question, and a chosen date and time range; searching through decoded data of said plurality of vehicles in order to find corresponding records for said data request, wherein said corresponding records match said unique surrogate user identification, said at least one chosen VIN, said question, and said chosen date and time range of said data request; replacing said unique user and device identification with said unique surrogate user identification for each of said corresponding records; enabling said specific App/IS profile to access said corresponding records, if said App/IS identification and said App/IS password correctly match said specific App/IS profile; enabling said specific App/IS profile to access said corresponding records, if said filter preferences of a specific user account does not restrict access to said corresponding records; and converting said corresponding records into requested units of measure, if said requested units of measure are sent by said specific App/IS profile.

* * * * *